US012789930B2

(12) United States Patent
Fittz

(10) Patent No.: US 12,789,930 B2
(45) Date of Patent: Nov. 10, 2026

(54) SYSTEMS AND METHODS FOR ADJUSTING AND SECURING A MICROMOBILITY VEHICLE SEAT

(71) Applicant: Lyft, Inc., San Francisco, CA (US)

(72) Inventor: Casey James Fittz, Oakland, CA (US)

(73) Assignee: Lyft, Inc., San Francisco, CA (US)

( * ) Notice: Subject to any disclaimer, the term of this patent is extended or adjusted under 35 U.S.C. 154(b) by 686 days.

(21) Appl. No.: 18/173,355

(22) Filed: Feb. 23, 2023

(65) Prior Publication Data

US 2024/0286692 A1 Aug. 29, 2024

(51) Int. Cl.
*B62J 1/08* (2006.01)

(52) U.S. Cl.
CPC ....................................... *B62J 1/08* (2013.01)

(58) Field of Classification Search
CPC ....... B62J 1/08; B62J 2001/085; B62K 19/36; F16B 7/10; F16B 7/1418; F16B 2/065
USPC ....................................................... 280/281.1
See application file for complete search history.

(56) References Cited

U.S. PATENT DOCUMENTS

| | | | |
|---|---|---|---|
| 5,548,876 | A | 8/1996 | Oetiker |
| 5,988,694 | A | 11/1999 | Brushaber |
| 7,303,448 | B1 | 12/2007 | Sproesser |
| 7,722,129 | B2 | 5/2010 | Cusack |
| D668,522 | S | 10/2012 | Henderson |
| D736,189 | S | 8/2015 | Cooper |
| 9,364,937 | B2 | 6/2016 | Taylor |
| 9,512,947 | B2 | 12/2016 | Giraldi |
| D777,548 | S | 1/2017 | Trotsky |
| 9,543,666 | B2 | 1/2017 | Wendt |
| D780,549 | S | 3/2017 | Zhang |
| D781,122 | S | 3/2017 | Zimmerman |
| D797,549 | S | 9/2017 | Dew |

(Continued)

FOREIGN PATENT DOCUMENTS

| | | |
|---|---|---|
| CA | 152631 | 2/2015 |
| CN | 208845907 U | 5/2019 |

(Continued)

OTHER PUBLICATIONS

Glarks "Glarks 12Pcs 6 Sizes 32-116mm Stainless Steel T-Bolt Hose Clamps . . . " accessed Aug. 30, 2025 at https://www.amazon.com/Glarks-32-116mm-Stainless-Intercooler-Assortment/dp/B08P1Q2JVN/?th=1; Date First Available: Nov. 23, 2020 (Year: 2020).*

(Continued)

*Primary Examiner* — Anne Marie M Boehler
*Assistant Examiner* — Tyler Jay Stanley
(74) *Attorney, Agent, or Firm* — Baker Botts L.L.P.

(57) ABSTRACT

Systems and methods related to seat post clamp assemblies for micromobility vehicles are disclosed. A seat post clamp assembly may include a seat clamp configured to physically secure the seat post clamp assembly to a seat tube of the micromobility transit vehicle. The seat post clamp may further include a lead screw rotatable about a longitudinal axis, a plurality of securing elements, a seat adjustment lever, a clamping band, and a housing. The lead screw may comprise sets of angled threads that engage with securing elements, so that rotation of the seat adjustment lever may enable a user to increase or decrease a clamping force applied by the clamping band on the seat tube of the micromobility vehicle.

20 Claims, 23 Drawing Sheets

(56) References Cited

U.S. PATENT DOCUMENTS

| | | | |
|---|---|---|---|
| D798,699 | S | 10/2017 | Roiser |
| D803,757 | S | 11/2017 | Giordano |
| D809,991 | S | 2/2018 | Giordano |
| D833,265 | S | 11/2018 | Meola |
| 10,408,371 | B2 | 9/2019 | Floyd |
| D893,239 | S | 8/2020 | Van |
| D938,816 | S | 12/2021 | Byerly |
| 2013/0312231 | A1 | 11/2013 | Lah |
| 2017/0191589 | A1 | 7/2017 | Floyd |
| 2019/0077478 | A1 | 3/2019 | Hu |
| 2020/0049454 | A1 | 2/2020 | Leutzinger |
| 2020/0094904 | A1 | 3/2020 | Labaere |
| 2021/0253191 | A1 | 8/2021 | Kole |
| 2022/0090880 | A1 | 3/2022 | Leutzinger |

FOREIGN PATENT DOCUMENTS

| | | |
|---|---|---|
| CN | 210769706 U | 6/2020 |
| KR | 300732280.0000 | 3/2014 |

OTHER PUBLICATIONS

Coavoo "T10 . . . Right and Left Hand BiDirection Lead Screw . . . " accessed Aug. 30, 2025 at https://www.amazon.com/Coavoo-Length-Direction-Thread-Screws/dp/B0B713BM3Q/; Date First Available : Jul. 19, 2022 (Year: 2022).*

Machining Doctor "Lead Angle (Threads)" snapshot date: Feb. 2, 2023, accessed Aug. 30, 2025 at https://web.archive.org/web/20230202172528/https://www.machiningdoctor.com/glossary/lead-angle/ (Year: 2023).*

Bolting Specialist "Stud Bolts with Reduced Shank" snapshot date: Dec. 25, 2021, accessed Aug. 30, 2025 https://web.archive.org/web/20211225070900/https://boltingspecialist.com/stud-bolts/stud-bolts-with-reduced-shank/ (Year: 2021).*

Murray, "A Comparison of T-Bolt and Worm Drive Clamps . . . " accessed Jan. 21, 2026, at https://www.murraycorp.com/post/a-comparison-of-t-bolt-and-worm-drive-clamps-choosing-the-right-clamp-for-your-application (Year: 2026).*

OA received for U.S. Appl. No. 29/729,832, mailed on Mar. 17, 2023, 16 pages.

OA received for U.S. Appl. No. 16/792,177, mailed on Mar. 17, 2023, 8 pages.

M5MVC-095080 DynoGrip-52 Self Centering Complete Vise Assembly 95 80, https://shop.mateworkholding.com/m5myc-095080.html, retrieved on Apr. 13, 2023, 4 pages.

ODIER Bike Bicycle Quick Release SeatPost Clamp, Google.com, [online], [obtained on Apr. 20, 2023], Available from internet https://li-deals.net/product/odier-bike-bicycle-quick-release: seatpost-clamp-34-9mm-31-8mm-mtb-bike-road-bike-casual-bike-seatpost-clamp/, 3 pages.

31.8 mm Alloy Quick Release Seat Post Clamp, Google.com, [online], [obtained on Apr. 20, 2023], Available from internet https://www.homedepot.com/pN entura-31-8-mm-AIloy-Quick-Release-Seat-Post-Clamp-250897/206781546?source-shoppingads &locale=en-US#overlay, 2 pages.

* cited by examiner

SYSTEMS AND METHODS FOR ADJUSTING AND SECURING A MICROMOBILITY VEHICLE SEAT

TECHNICAL FIELD

This disclosure relates generally to vehicle seats, and more particularly to systems and methods for adjusting and securing vehicle seats.

BACKGROUND

A micromobility vehicle may serve numerous users every day. Users may have diverse body sizes, shapes and masses, with different heights, limb lengths, weight distributions, and general health levels. Thus, various components of the micromobility vehicle may need to be adjusted several times throughout the day to suit each individual user's comfort and needs. For example, a seat of the micromobility vehicle may need to be frequently adjusted such that an individual may be able to comfortably sit and operate the vehicle. Such a seat may be coupled to a seat post. Since a seat post may experience heavy use and frequent adjustments, mechanisms for securing the seat post can often experience failure. For example, a mechanism for securing the seat post may become loose over the duration of a user trip, which can require frequent maintenance, adjustments, and/or costly repairs. Additionally, such micromobility vehicle failures may cause user discomfort and inconvenience if the failure is not promptly discovered and corrected.

Therefore, there is a need for improved vehicle seat adjustment and securing systems and methods. Such systems and methods should provide durability and reliability, such that a seat post on a transit vehicle can be consistently and securely adjusted after extensive daily use by numerous users. Such systems and methods should also provide for a convenient way to adjust the seat post and enjoy a comfortable ride on the transit vehicle.

SUMMARY

Techniques are disclosed for systems and methods related to seat clamp assemblies for micromobility vehicles. In an example embodiment, a seat post clamp assembly for a micromobility vehicle may comprise a lead screw that is rotatable about a longitudinal axis. The lead screw may further comprise a first screw portion having a first set of angled threads and a second screw portion having a second set of angled threads, along with an unthreaded portion provided between the first and second screw portions.

Further, in particular embodiments, which may combine the features of some or all above embodiments, the seat post clamp assembly may comprise first and second securing elements that are longitudinally separated from each other by the unthreaded portion of the lead screw, each securing element being disposed on the respective screw portions of the lead screw, and being further configured to engage with respective sets of angled threads of the lead screw. In particular embodiments, first and second ends of a seat adjustment lever may be additionally coupled to first and second screw portions of the lead screw, respectively.

In particular embodiments, which may combine the features of some or all above embodiments, a clamping band may be configured to secure the seat post clamp assembly to a seat post tube of the micromobility vehicle. First and second ends of the clamping band may be pivotably coupled to the first and second securing elements, respectively.

Rotation of the seat adjustment lever may be associated with the first and second securing elements moving toward or away from each other along the respective sets of angled threads, so as to increase or decrease a clamping force applied by the clamping band on the seat post tube.

In particular embodiments, which may combine the features of some or all above embodiments, the first and second portions may comprise oppositely directed lead screws.

In particular embodiments, the first and second sets of angled threads may be characterized as having a helix angle greater than 0 degrees and less than 5 degrees.

In particular embodiments, which may combine the features of some or all above embodiments, the first and second screw portions of the lead screw may be configured to apply a longitudinal self-centering force on the first and second securing elements when the lead screw is rotated about the longitudinal axis.

In particular embodiments, which may combine the features of some or all above embodiments, the first and second screw portions of the lead screw may be configured to apply equal and oppositely directed forces on the first and second securing elements when the lead screw is rotated about the longitudinal axis, the applied forces being parallel to the longitudinal axis of the lead screw and collinear with each other.

In particular embodiments, which may combine the features of some or all above embodiments, a seat post clamp assembly may further comprise a housing structure. The housing structure may further comprise a curved bearing surface in contact with the unthreaded portion of the lead screw, and one or more bearing surfaces slidably supporting the first and second securing elements.

In particular embodiments, which may combine the features of some or all above embodiments, the lead screw, when rotated about the longitudinal axis, may be configured to apply a radial self-centering force.

In particular embodiments, which may combine the features of some or all above embodiments, the first set of angled threads may be formed with a spiral in an opposite direction to the second set of angled threads.

In particular embodiments, which may combine the features of some or all above embodiments, the first and second securing elements may be configured to move toward or away from each other along a translation axis that is parallel to the longitudinal axis of the lead screw, the translation axis being offset from the longitudinal axis by an offset distance toward the seat post tube, wherein the offset distance facilitates consistent application of the clamping force by the clamping band on the seat post tube.

In particular embodiments, which may combine the features of some or all above embodiments, the first and second sets of angled threads may comprise an increased thread pitch radius enabled by the offset distance while including mechanical clearance for operation, wherein the increased thread pitch radius facilitates self-locking operation and an increased clamping motion range based on a fixed rotational range of the seat adjustment lever.

In particular embodiments, which may combine the features of some or all above embodiments, the lead screw comprising the first and second screw portions and the unthreaded portion may form a unitary part.

In particular embodiments, which may combine the features of some or all above embodiments, a micromobility vehicle may comprise a frame, two or more wheels rotatably coupled to the frame, and a seat post clamp assembly located in the frame.

In specific embodiments, which may combine the features of some or all above embodiments, a method for assembling a seat post clamp assembly for a micromobility vehicle may include engaging a first set and a second set of angled threads of a lead screw with a first securing element and a second securing element, respectively, the lead screw being rotatable about a longitudinal axis. In particular embodiments, the first set of angled threads may be formed with a spiral in an opposite direction to the second set of angled threads. The method may further include assembling and securing the lead screw and the securing elements within a housing structure. The first and second securing elements may be pivotably coupled to a first end and a second end of a clamping band, respectively. The clamping band configured to secure the seat post clamp assembly to a seat tube of the micromobility vehicle may be coupled to a seat adjustment lever.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

For a more complete understanding of the present disclosure and its features and advantages, reference is now made to the following description, taken in conjunction with the accompanying drawings, which are not drawn to scale, and in which.

DETAILED DESCRIPTION

Figure 1:
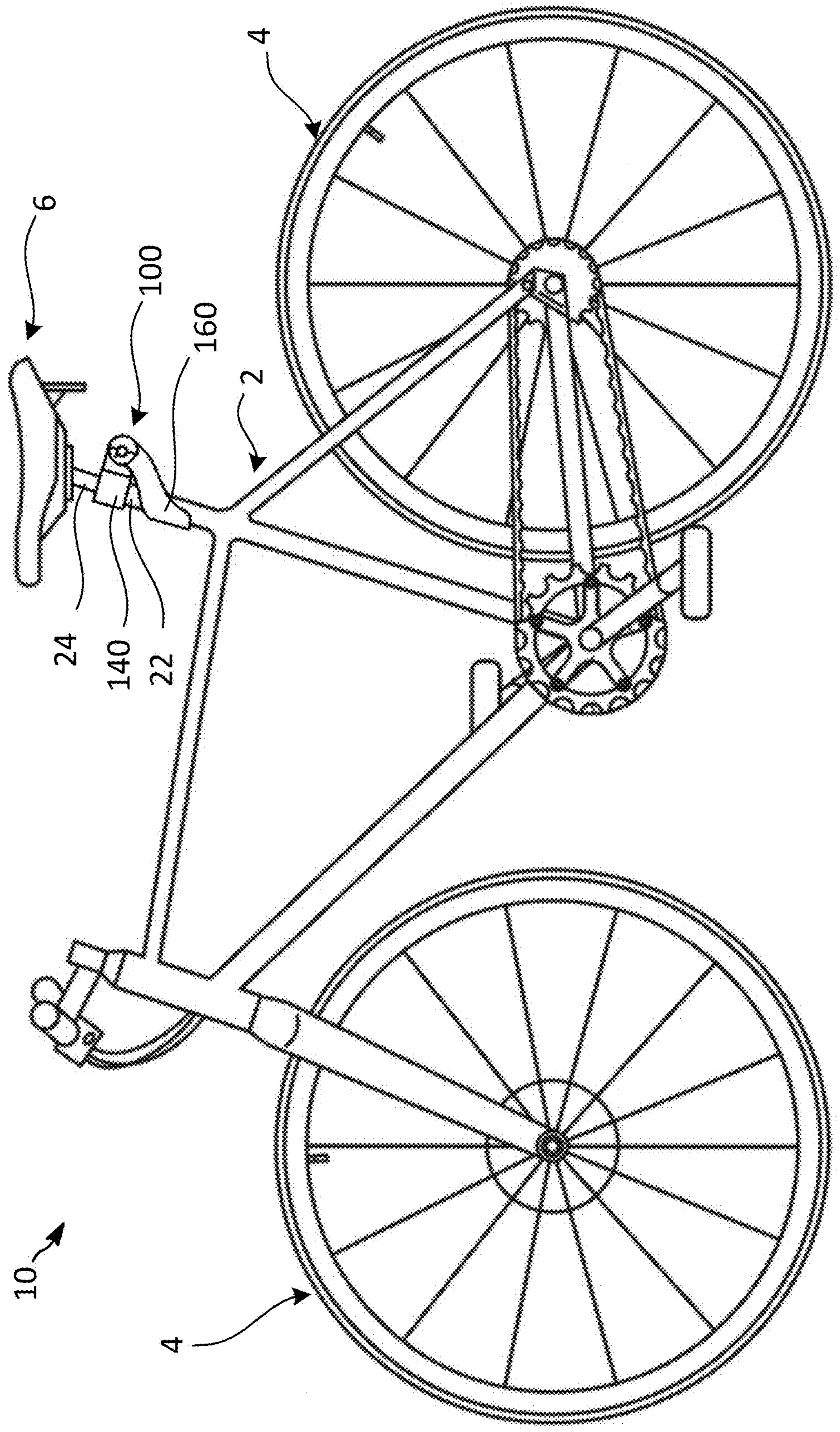
FIG. 1 illustrates a side view of a bicycle as an example micromobility vehicle, according to particular embodiments.

In accordance with various embodiments of the present disclosure, seat post clamp assemblies for micromobility vehicles and related methodologies are provided to improve usability and/or reduce operational burdens associated with servicing, maintaining or replacing components of micromobility vehicles. As a non-limiting example, a micromobility vehicle may be a single-user or multi-user vehicle such as a bicycle or a scooter, and may be designed for traveling short distances (e.g., less than 5 miles, less than 10 miles, etc.) relative to conventional shared vehicles, such as cars. In specific embodiments, a micromobility vehicle may include at least two wheels, a drivetrain (e.g., a front gear, chain and rear gear or cassette) for mobilizing the micromobility vehicle (e.g., for propelling at least one of the wheels), a handlebar for steering the micromobility vehicle, and a frame. In particular embodiments, a frame may comprise a head tube for supporting the handlebar, a seat tube for supporting a saddle (e.g., a seat), and a down tube that connects the head tube and the seat tube. As a further non-limiting example, a seat post clamp assembly may include a seat post clamp configured to physically secure the seat post clamp assembly to a seat tube of various types of micromobility transit vehicles.

A micromobility vehicle's seat post may commonly support a user's weight through a seat connected to the frame in a cantilever configuration. Based on micromobility vehicle design requirements to accommodate a large range of users, including tall and/or heavy users, there has been a need to design increasingly longer and stronger seat post configuration, which are often also consequently thicker for strength and durability. Additionally, as micromobility vehicles provide daily transport to a multitude of users of different heights, weights, and preferences, the seat post is frequently and rapidly re-adjusted in the field. Design requirements, therefore, must also provide simple, reliable, safe, and consistent means of seat post adjustment to the user, while also controlling related maintenance and/or repair costs over time for the micromobility vehicle operator.

The inventors have recognized several issues with conventional seat post clamp assemblies in general, and for addressing challenges for scaling conventional designs to accommodate thicker, stronger seat posts based on design requirements, in particular.

Conventional seat post clamp assemblies often rely on applying a clamping force at a clamping location that is at a significant offset distance from the seat tube. Consequently, based on the large clamping forces being applied, conventional clamps may experience significant bending moments and subsequent part failure at the roots near the seat tube of the clamp extensions. Additionally, conventional clamps in micromobility applications may experience significant deformations due to the large applied bending moments, which may additionally impart highly non-uniform clamping forces on the seat tube. Further, mechanisms for operating conventional clamps may experience large and highly misaligned forces due to the above-mentioned deformation, which may lead to uneven and premature mechanism and component wear, accelerated fatigue failure, and loss of adjustment stability and operating consistency over the life of the clamp.

Conventional seat post clamps may also be prone to back-driving, i.e., unintentional loosening based on received external disturbances and/or forces. For example, a perturbation such as going over a large bump on the road during a ride may provide sufficient acceleration to a massive component within the clamp assembly to operate the mechanism "in reverse" or "pop open" the clamp without user intention or intervention, which may create inconvenient, unsafe, and/or expensive situations for users as well as vehicle operations.

With reference to a need to accommodate thicker and stronger seat tubes, conventional seat post clamps often do not scale well to larger sizes. For instance, to be appropriately designed for operating with a thicker seat tube, many conventional seat post clamp designs may require a larger primary coupling member for achieving the higher displacements and/or forces required. However, based on a conventional design, a larger coupling member may necessitate locating the coupling member even farther away from the seat tube for packaging reasons, exacerbating the cantilevered application of clamping force, thereby accelerating the failure modes described above.

Furthermore, particular seat post clamp assemblies may need to overcome additional design constraints based on at least vehicle geometry considerations and/or human user comfort. For instance, vehicle geometric constraints, such as an interfering down tube or seat, may significantly limit the possible range of motion of operating a handle of the clamp. As a non-limiting example, a seat post clamp assembly may need to accomplish the full range of clamping displacement and force required to secure the seat, based on a fixed 70° available total range of angular rotation of a seat adjustment lever. As discussed previously, a thicker seat post tube will usually require a larger clamp displacement to be traversed for the same angular rotation range of the lever, which must be achieved without exceeding a reasonable force requirement for safe user operation.

The inventors have recognized and appreciated that a scalable and adaptable design for a seat post clamp assembly is needed that provides a consistent, uniform circumferential clamping force on the seat tube, and is applied as close to the seat tube as possible. Further, as a seat post clamp assembly for a thicker seat tube needs to cover a larger closing displacement actuated by the same limited angular motion range of a seat adjustment lever, an improved design must accomplish this rotation-to-translation action efficiently. A desirable design should ideally also be self-locking, i.e., predisposed to not back-drive or pop open inadvertently. Instead, an improved seat post clamp assembly design should offer consistent force requirements to tighten or loosen the clamping force on the seat tube over extended time frames and long operational cycles, while requiring low maintenance and few adjustments. Finally, an improved seat post clamp assembly may also be fully self-centering, as will be further detailed herein.

Turning to the drawings, FIG. 1 depicts a side view of bicycle 10 as an example type of a micromobility vehicle, in particular embodiments. Bicycle 10 may comprise a frame 2, and a plurality of wheels 4 rotatably coupled to frame 2. In particular embodiments, bicycle 10 may further comprise a seat tube 22, which may be integral to frame 2 or coupled to frame 2. In particular embodiments, a seat post 24 may couple a seat 6 to seat tube 22 and/or frame 2. In particular embodiments, bicycle 10 may include a seat post clamp assembly 100, which may comprise and employ a clamping band 140 to apply a clamping force on seat tube 22 to secure seat post 24 and seat 6 to frame 2 of bicycle 10.

In some embodiments, the bicycles described herein, e.g., bicycle 10 illustrated in FIG. 1, may be a motorized vehicle. As a non-limiting example, bicycle 10 and/or other micromobility vehicles contemplated in this disclosure may be partially or wholly propelled by one or more integrated electric motors.

Figure 2:
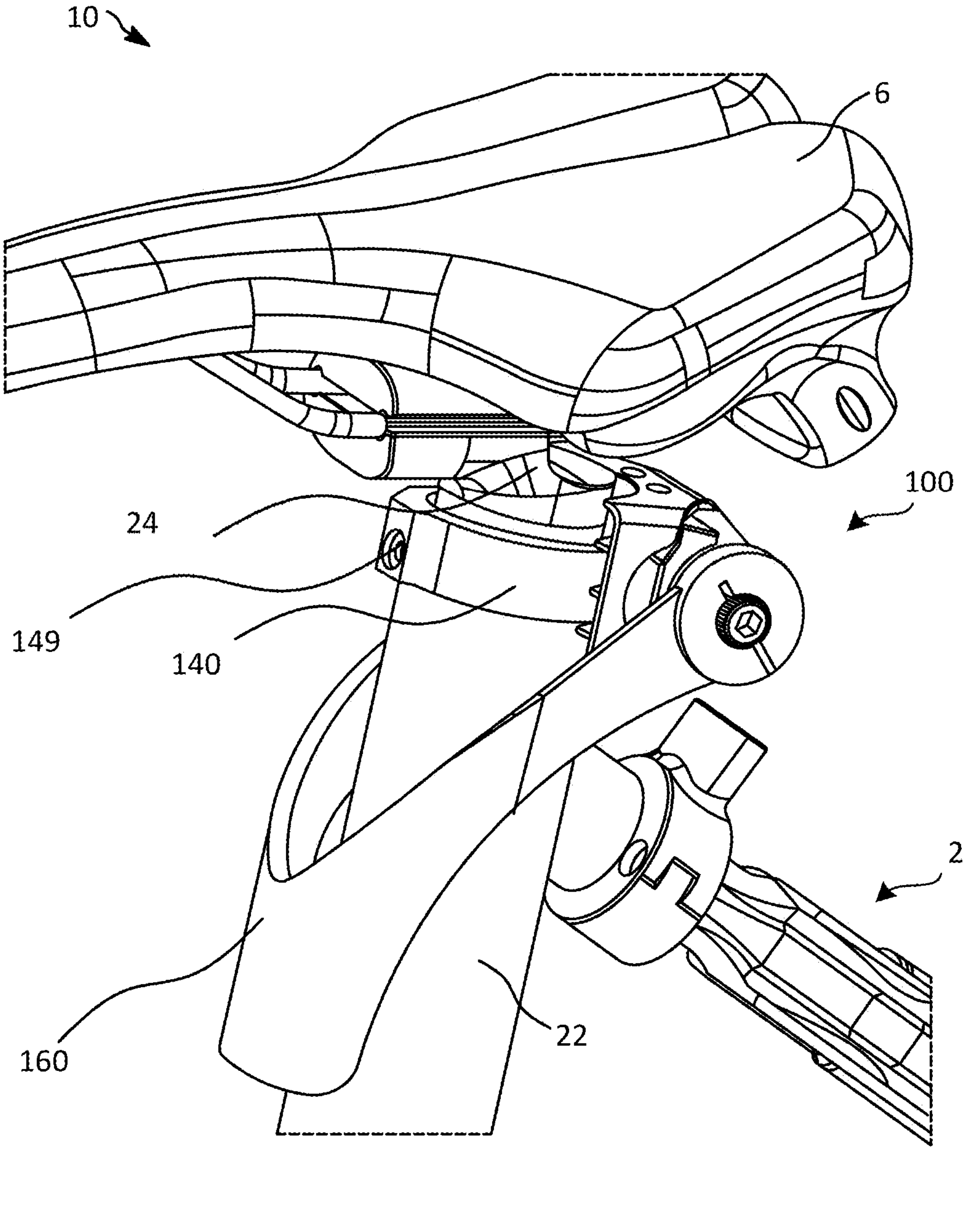
FIG. 2 illustrates a close-up perspective view of a seat post clamp assembly attached to a seat tube of a micromobility vehicle, according to particular embodiments.

FIG. 2 illustrates a close-up perspective view of a seat post clamp assembly 100 attached to a seat tube 22 of a micromobility vehicle 10, according to particular embodiments. With reference to at least FIGS. 1 and 2, in particular embodiments, seat post clamp assembly 100 may also comprise a seat adjustment lever 160, which may enable a user of bicycle 10 to increase or decrease a clamping force applied by clamping band 140 on seat tube 22 by rotating seat adjustment lever 160. By way of example and not limitation, a user of bicycle 10 may operate seat adjustment lever 160 to loosen clamping band 140 relative to seat post 24, enabling adjustment of the height and/or position of seat 6. As another non-limiting example, a user of bicycle 10 may operate seat adjustment lever 160 to tighten clamping band 140 relative to seat post 24, in order to secure seat 6 of bicycle 10 in position. Tightening clamping band 140 may create an interference fit between seat tube 22 and seat post 24, preventing relative motion and thereby securing seat 6 based on desired adjustment settings.

In particular embodiments, clamping band 140 may be coupled to seat tube 22 at one or more connection points 149 on clamping band 140. By means of example and not limitation, clamping band 140 may be coupled to seat tube 22 by a pin, fastener, or other suitable coupling and/or anti-rotation component or mechanism applied at one or more connection points 149.

Figure 3A:
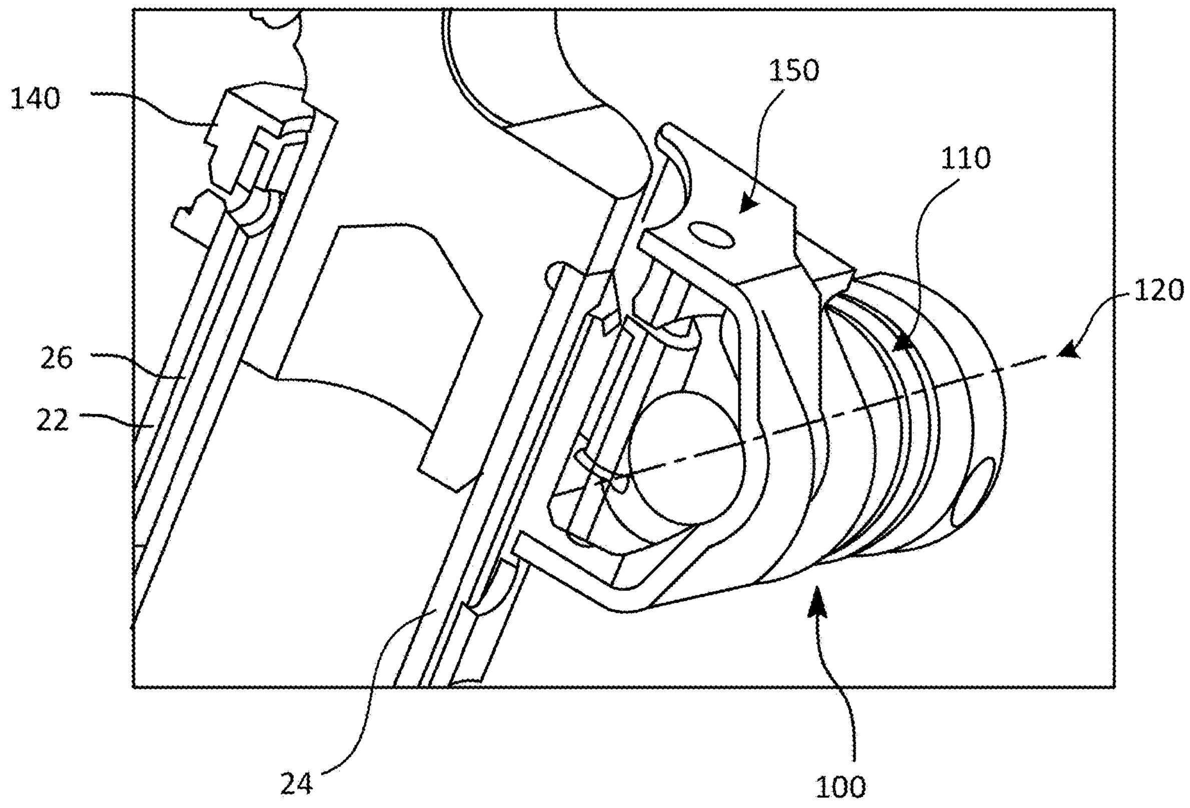
FIGS. 3A-3B illustrate partial sectional perspective views of a seat post clamp assembly attached to a seat tube of a micromobility vehicle, according to particular embodiments.
Figure 3B:
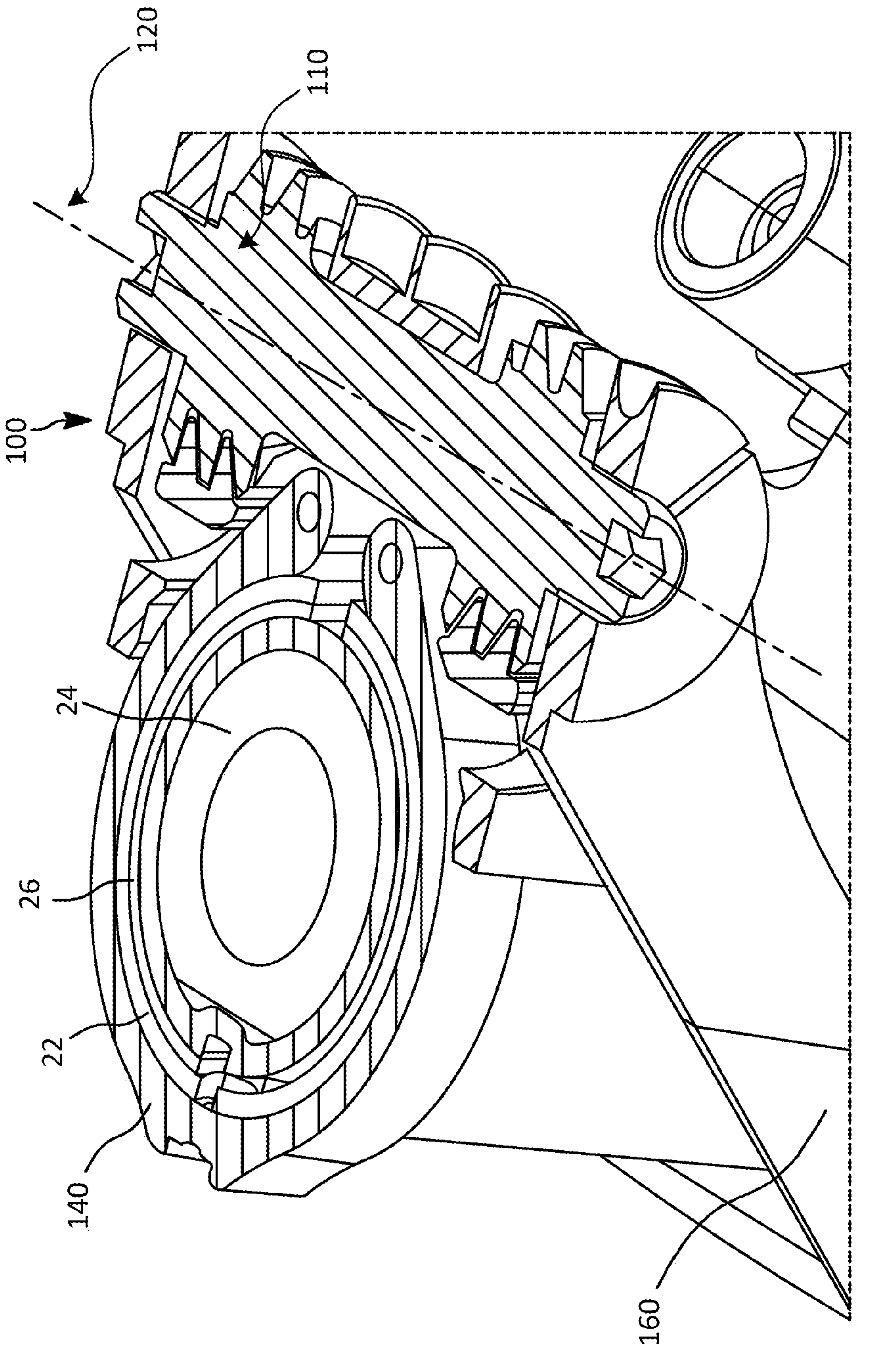

FIGS. 3A-3B illustrate partial sectional perspective views of seat post clamp assembly 100 attached to seat tube 24 of a micromobility vehicle, according to particular embodiments. A seat tube sleeve 26 may be employed between seat tube 22 and seat post 24 in particular embodiments. By way of example and not limitation, seat tube sleeve 26 may provide a replaceable wear surface thereby protecting frame 2 and/or seat tube 22 from wear.

Figure 4A:
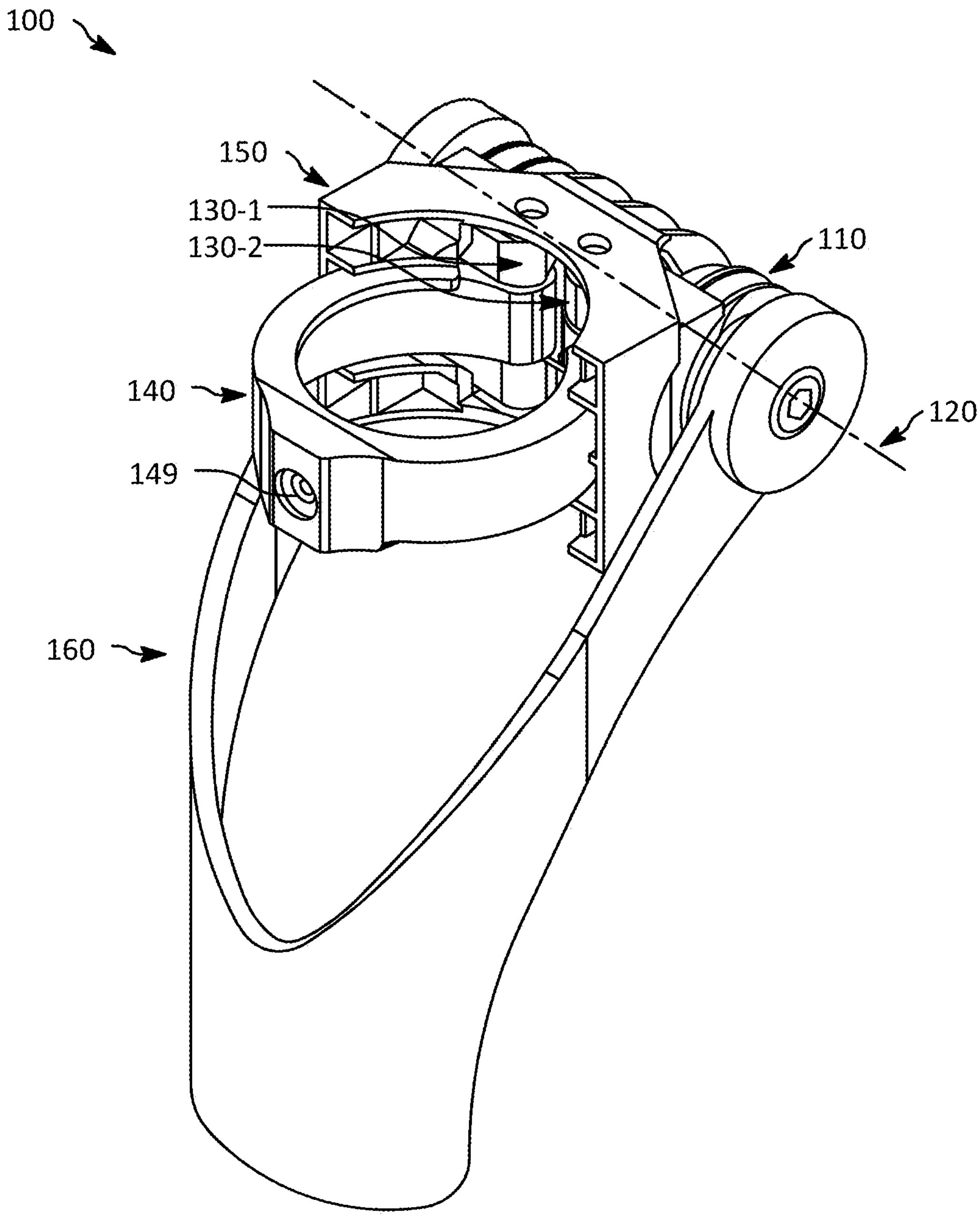
FIGS. 4A-4B illustrate perspective and partial sectional views of a seat post clamp assembly, according to particular embodiments.
Figure 4B:
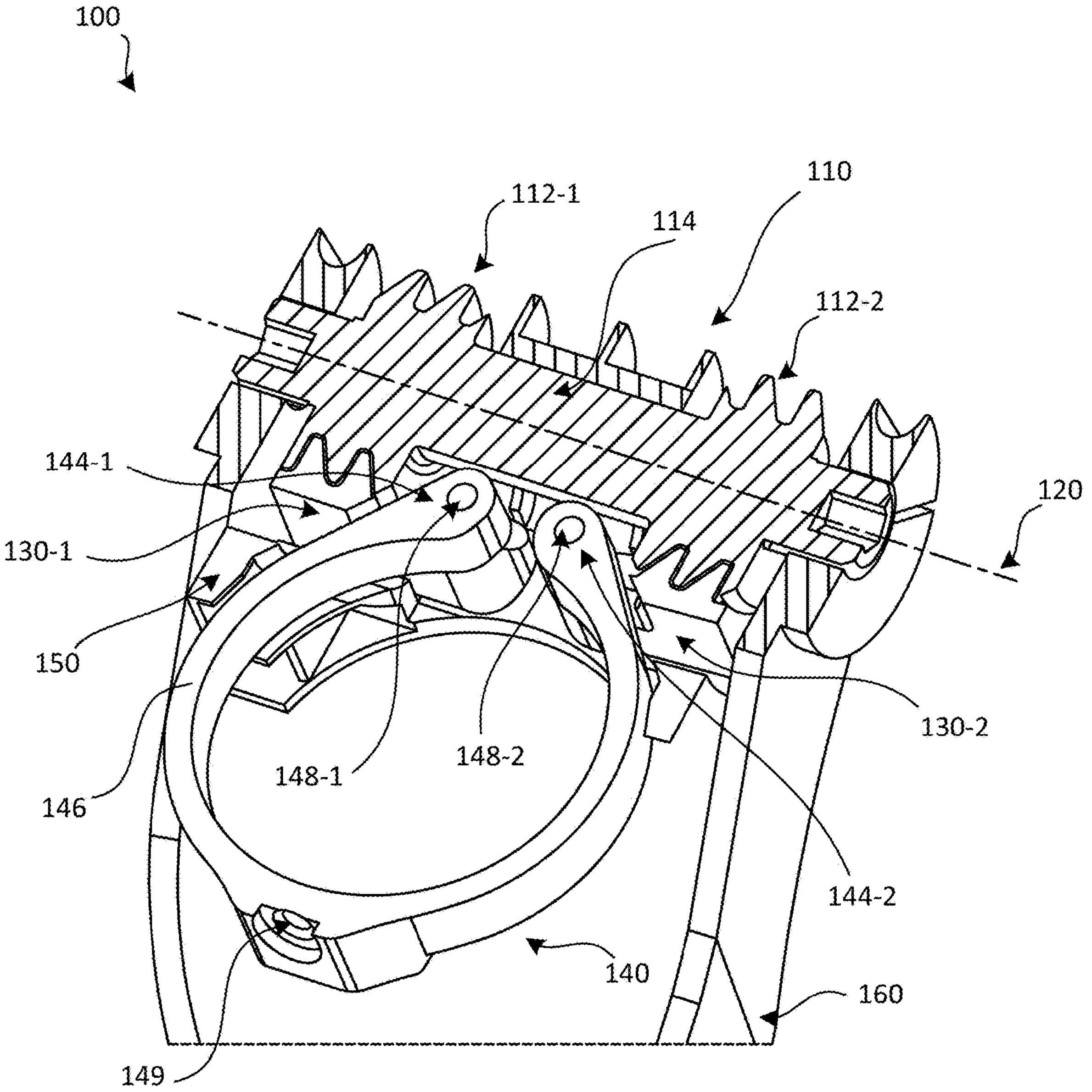
Figure 5:
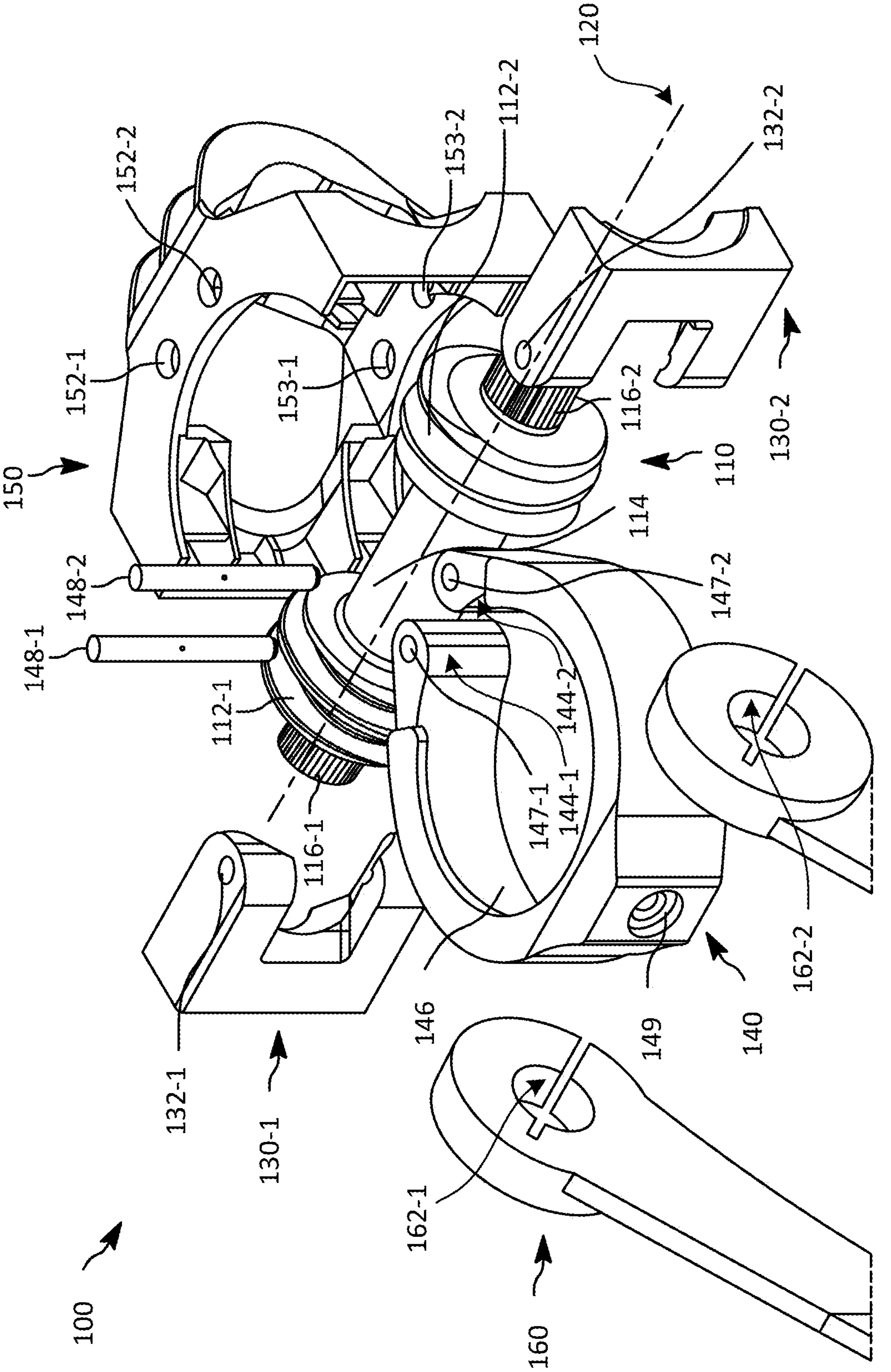
FIG. 5 illustrates a perspective exploded partial view of a seat post clamp assembly, according to particular embodiments.

FIGS. 4A-4B illustrate perspective and partial sectional views of seat post clamp assembly 100, according to particular embodiments. FIG. 5 illustrates a perspective exploded partial view of a seat post clamp assembly 100, according to particular embodiments.

In particular embodiments, seat post clamp assembly 100 may comprise a lead screw 110 rotatable about a longitudinal axis 120. With reference to at least FIGS. 4A-4B and 5, in particular embodiments, lead screw 100 may comprise a first screw portion 112-1 having a first set of angled threads proximate a first end 116-1, a second screw portion 112-2 having a second set of angled threads proximate a second end 116-2, and/or an unthreaded portion 114 between the first and second screw portions. In particular embodiments, the first and second sets of angled threads of the first and second screw portions 112-1 and 112-2, respectively, may be oppositely threaded, i.e., formed with threads spiraling in opposite directions relative to each other. In particular embodiments, lead screw 110 comprising first screw portion 112-1, second screw portion 112-2, and unthreaded portion 114 may form a unitary or single, continuous part.

Seat post clamp assembly 100 may comprise one or more securing elements. By way of example and not limitation, one or more securing elements may comprise threaded components, such as bolts, screws, nuts, and/or half-nuts. In particular embodiments, seat post clamp assembly 100 may comprise a first securing element 130-1 disposed on a portion of first screw portion 112-1 of lead screw 110, and a second securing element 130-2 disposed on a portion of second screw portion 112-2 of lead screw 110.

In particular embodiments, first and second securing elements 130-1 and 130-2, respectively, may be longitudinally separated from each other. As a non-limiting example, securing elements 130-1 and 130-2 may be longitudinally separated from each other by a full or partial extent of the unthreaded portion 114 of lead screw 110. In particular embodiments, securing elements 130-1 and 130-2 may be laterally offset from longitudinal axis 120 of lead screw 110. In particular embodiments, first securing element 130-1 may be configured to engage with the first set of angled threads of first screw portion 112-1, and second securing element 130-2 may be configured to engage with the second set of angled threads of second screw portion 112-2.

In particular embodiments, seat adjustment lever 160 may have a first end 162-1 coupled to first end 116-1 of lead screw 110, and a second end 162-2 coupled to second end 116-2 of lead screw 110.

In particular embodiments, clamping band 140 may comprise a first end 144-1 and a second end 144-2 opposite the first end 144-1. As discussed previously, clamping band 140 may be configured to secure seat post clamp assembly 110 to seat tube 22 of a micromobility vehicle, while enabling selective tightening (i.e., increasing) and loosening (i.e., decreasing) of an applied clamping force to permit seat 6 to be adjusted and/or secured.

In particular embodiments, first end 144-1 of clamping band 140 may be pivotably coupled to first securing element 130-1, and second end 144-2 of clamping band 140 may be pivotably coupled to second securing element 130-2. By way of example and not limitation, securing elements 130-1 and 130-2 may be provided with bores and/or keyways, such as 132-1 and 132-2, respectively. Similarly, as further non-limiting examples, first and second ends 144-1 and 144-2 of clamping band 140 may be provided with bores and/or keyways, such as 147-1 and 147-2, respectively. In particular embodiments corresponding to these non-limiting examples, shear pins 148-1 and 148-2 may be used to pivotable couple the first and second ends 144-1 and 144-2 with first and second securing elements 130-1 and 130-2, respectively. By way of example and not limitation, a careful selection of shear pins 148-1 and 148-2 to be press-fitting, loose fitting, and/or combinations thereof, relative to bores and/or keyways (such as 132-1, 132-2, 147-1, and/or 147-2) may be implemented to enable the desired pivotable coupling.

In particular embodiments, a housing structure 150 may be provided to secure, support, and/or contain parts of seat post clamp assembly 100. By way of example and not limitation, housing structure 150 may be cast or otherwise formed with a unitary construction. As another non-limiting example, housing structure 150 may be constructed in multiple pieces, such as a clam shell construction. In particular embodiments, housing structure 150 may provide one or more bearing and/or bushing surfaces for parts of seat post clamp assembly 100 that experience linear or rotational motion relative to housing structure 150. Additional details of these aspects will be disclosed in later sections.

In particular embodiments, shear pins 148-1 and 148-2 may couple to and/or constrain securing elements 130-1 and 130-2, respectively. In particular embodiments, securing elements 130-1 and 130-2, as a pair of structural members and/or in further combination with lead screw 110, may be used to secure housing structure 150. By way of a non-limiting example, the same shear pins 148-1 and 148-2 that pivotably couple parts of clamping band 140 with parts of securing elements 130-1 and 130-2 may be used to indirectly or directly secure housing structure 150 to seat post clamp assembly 100. In non-limiting examples, it may be possible to use securing elements 130-1 and 130-2, and/or lead screw 110, and/or bores and/or keyways, such as 152-1 and 152-2, separately or in conjunction with shear pins, such as 148-1 and/or 148-2, to implement securing housing structure 150 to seat post clamp assembly 100.

Figure 6:
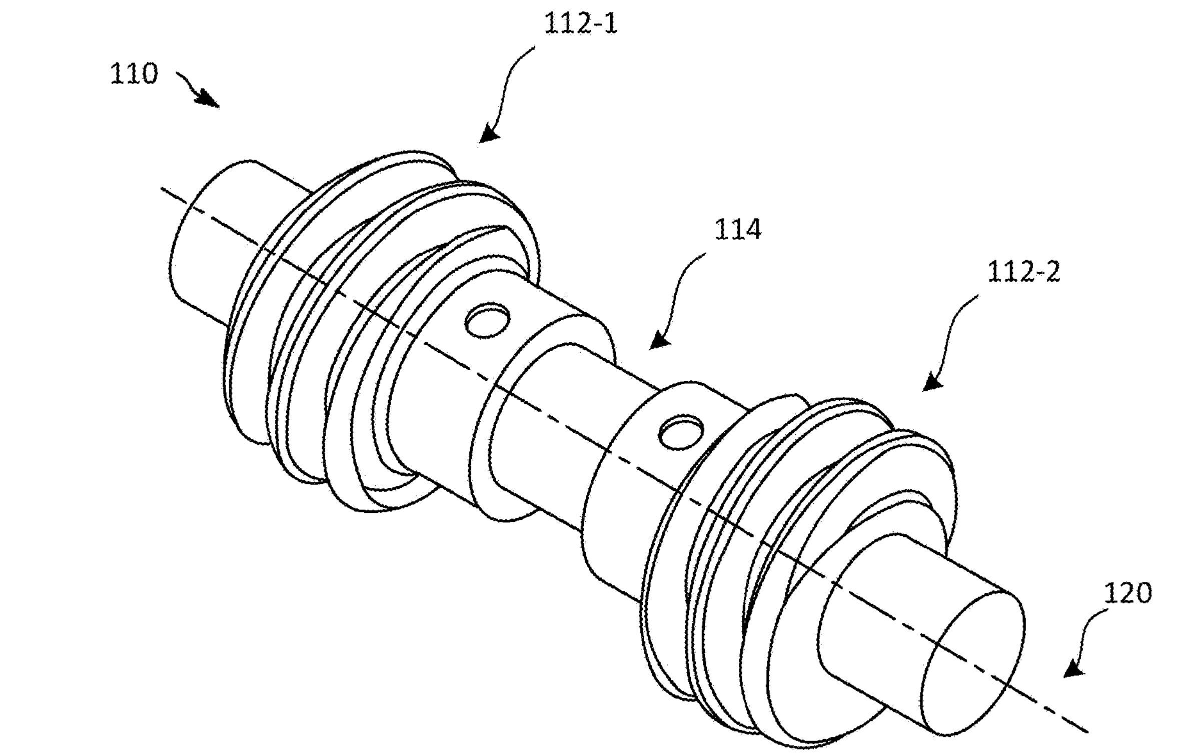
FIG. 6 illustrates a perspective view of a multi-part lead screw, according to particular embodiments.
Figure 7:
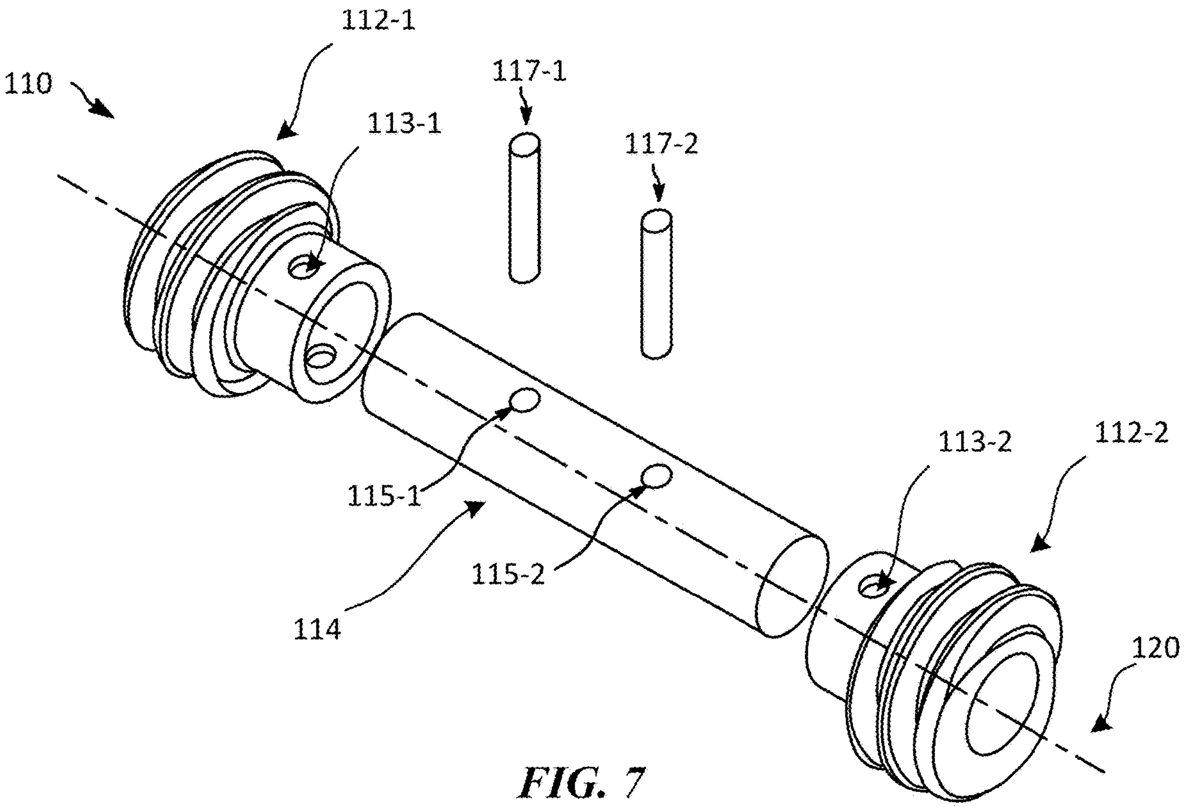
FIG. 7 illustrates an exploded perspective view of a multi-part lead screw, according to particular embodiments.

While it has been disclosed previously that lead screw 110 may form a unitary or single, continuous part, it should be appreciated that other constructions and configurations of lead screw 110 are possible and contemplated in this disclosure. FIGS. 6 and 7 illustrate perspective and exploded views of a multi-part lead screw. In particular embodiments, such as depicted in FIGS. 6 and 7, lead screw 110 may be assembled from multiple parts. By way of example and not limitation, lead screw 110 may include modular parts comprising first screw portion 112-1, second screw portion 112-2, and/or an unthreaded shaft portion 114. In particular embodiments, bores and/or keyways, such as 113-1, 113-2, 115-1, and/or 115-2, may be provided in modular parts. Shear pins, such as 117-1 and 117-2, may be used to constrain and couple some or all of the modular parts to form lead screw 110.

Figure 8B:
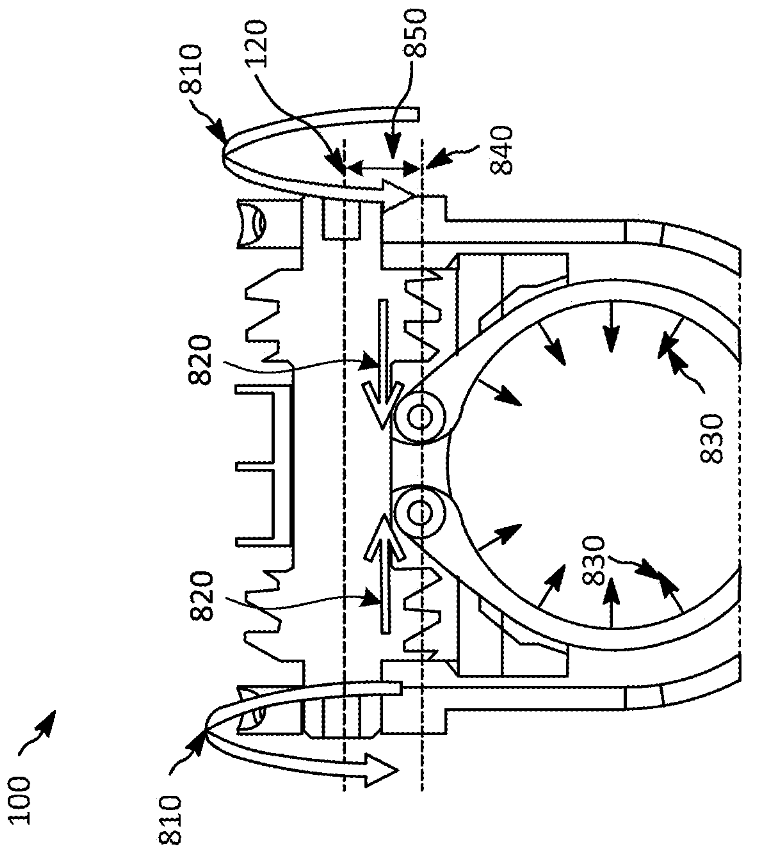
FIGS. 8A-8B illustrate partial sectional top views of a seat post clamp assembly, according to particular embodiments.
Figure 8A:
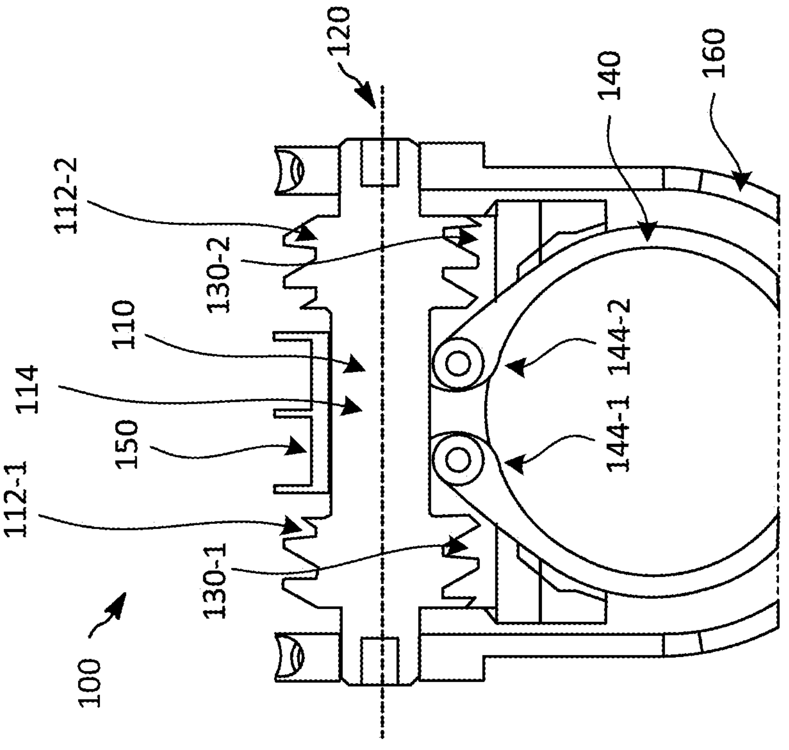

FIGS. 8A-8B illustrate partial sectional top views of a seat post clamp assembly 100, according to particular embodiments. In particular embodiments, housing structure 150 may directly support lead screw 110 as a bushing. As a non-limiting example, unthreaded portion 114 may be directly supported by housing structure 150, thus providing a contact interface for the relative motion between lead screw 110 and housing structure 140.

As discussed before, seat adjustment lever 160 may be coupled to lead screw 110, as a non-limiting example, at their respective ends. Consequently, in particular embodiments, rotation of seat adjustment lever 160 imparts rotation 810 to lead screw 110. In particular embodiments, screw portions 112-1 and 112-2, having oppositely directed angled threads, may be configured to engage with first and second securing elements 130-1 and 130-2, respectively. When lead screw 110 is rotated 810, the first and second securing elements 130-1 and 130-2 correspondingly experience linear motion, or translation, toward or away from each other, the motion being parallel to longitudinal axis 120. As a result, the first and second securing elements 130-1 and 130-2 may exert a force 820 on the ends 144-1 and 144-2, respectively, of clamping band 140, to which the securing elements are pivotably connected.

For clarity, force vectors 820 are depicted in FIG. 8B as directed toward each other. However, it should be recognized that while force vectors 820 may be directed toward each other corresponding to one direction of rotation 810 of seat adjustment lever 160 and lead screw 110, as shown, force vectors acting on ends 144-1 and 144-2 of clamping band 140 may instead be directed away from each other, in opposite directions (i.e., opposite to the orientation of 820), the oppositely directed force vectors corresponding to an opposite direction of rotation (i.e., opposite to 810) of seat adjustment lever 160 and lead screw 110.

In particular embodiments, the clamping band 140 may apply an annular compression force 830 on seat tube 22. Based on the above discussion, rotating seat adjustment lever 160 and lead screw 110 in one direction may bring ends 144-1 and 144-2 of clamping band 140 closer to each other, tightening and increasing a clamping force applied by clamping band 140 on seat tube 22. Conversely, rotating seat adjustment lever 160 and lead screw 110 in the opposite direction may apply a force to separate ends 144-1 and 144-2 of clamping band 140 farther from each other, loosening and decreasing a clamping force applied by clamping band 140 on seat tube 22.

It should be recognized that seat post clamp assembly 100 may enable application of a linear force along a translation axis 840 based on a rotational input about a longitudinal axis 120, where the two axes 840 and 120 may not be collinear. In particular, translation axis 840 may be offset from longitudinal axis 120 to be closer to the ends 144-1 and 144-2 of clamping band 140, and to seat tube 22, by a non-zero distance 850.

In particular embodiments, a positive offset distance 850, referred to herein as offset distance 850, may facilitate consistent application of clamping forces exerted by clamping band 140 on seat post tube 22. As a non-limiting example, offset distance 850 enables application of uniform circumferential clamping force on seat tube 22, applied as close as possible to seat tube 22. As previously described, this is unlike many conventional designs wherein larger sizing of seat post clamp assemblies often necessitate application of clamping forces farther away from the seat tube, increasing cantilevered moments, uneven wear, component deformation and failure, non-uniform force application, as well as loss of operational consistency over time, often requiring frequent adjustments, and/or experiencing structural failures.

FIGS. 9A-9D illustrate partial perspective views of a sequence of operating a seat post clamp assembly 100 to increase or decrease a clamping force, according to particular embodiments. Sequentially viewing from FIGS. 9A through 9D, seat adjustment lever 160 is depicted to be rotated in the direction 910. In particular embodiments, securing elements 130-1 and 130-2 may correspondingly translate toward each other in conjunction with this direction of rotation 910, and may apply a linear force on ends 144-1 and 144-2 of clamping band 140 toward each other, thereby tightening and increasing a clamping force and annular compression applied by clamping band 140 on seat tube 22.

Figure 9A:
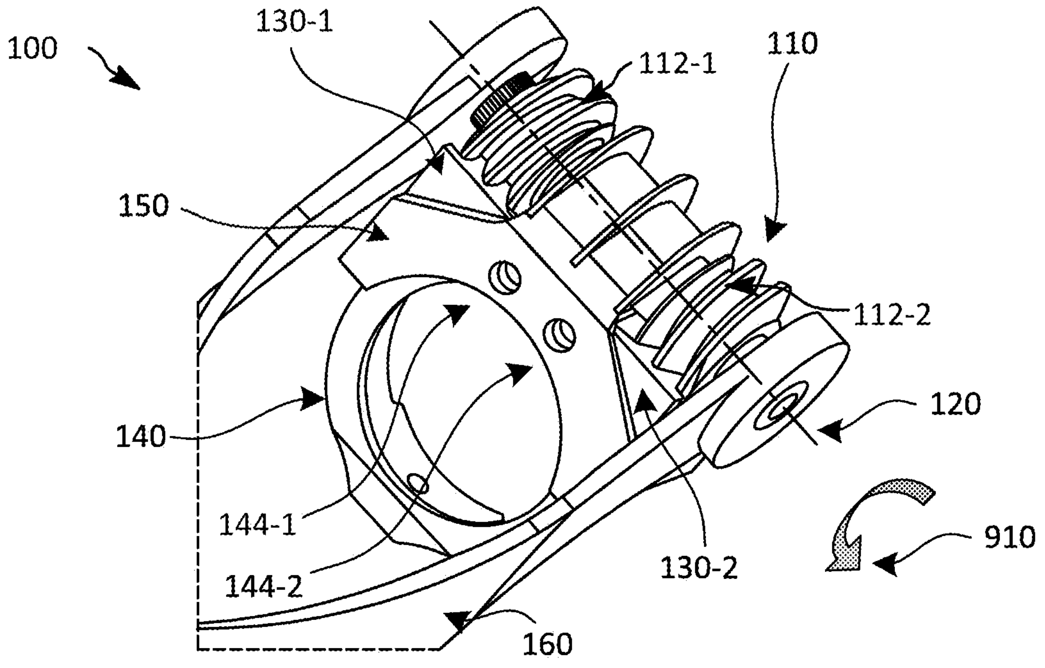
FIGS. 9A-9D illustrate partial perspective views of a sequence of operating a seat post clamp assembly to increase or decrease a clamping force, according to particular embodiments.
Figure 9B:
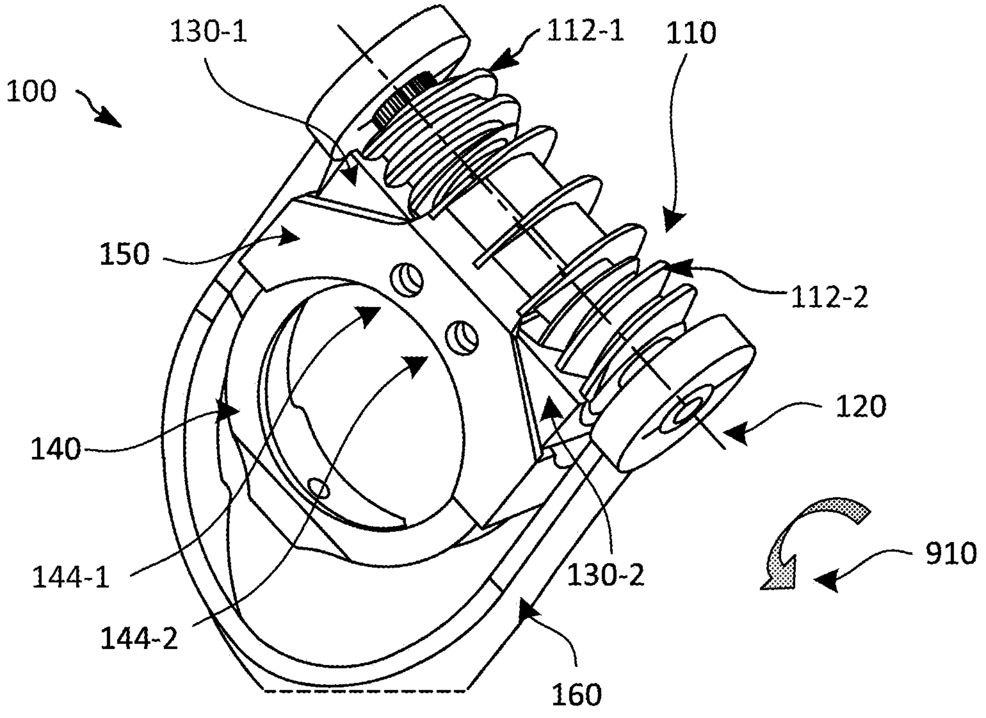
Figure 9C:
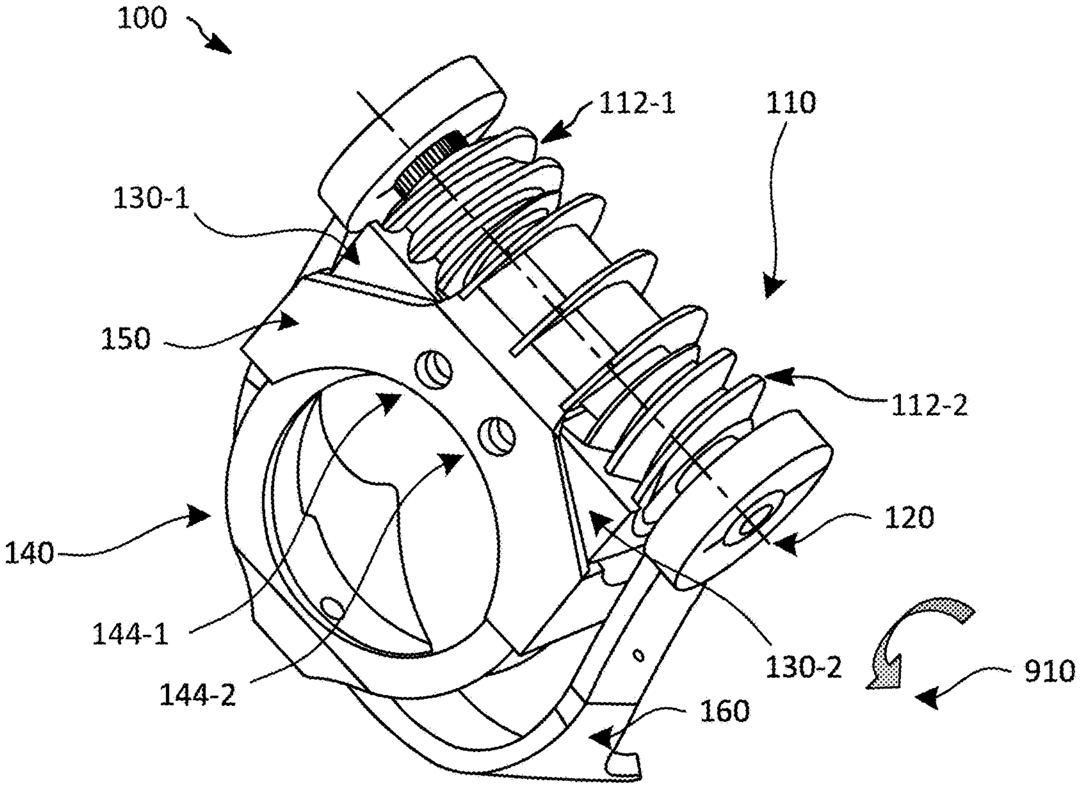
Figure 9D:
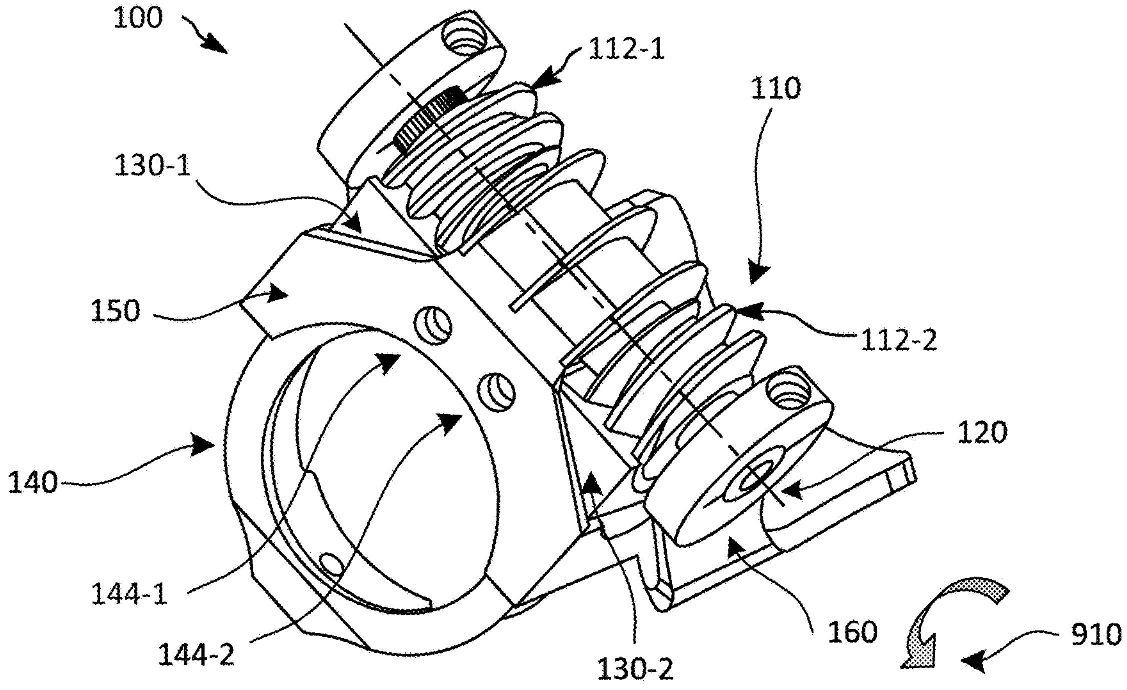

Reversing the sequence of FIGS. 9D through 9A may be interpreted to perform the opposite action, in particular disclosed embodiments. In other words, rotating seat adjustment lever 160 opposite to direction 910 may act to loosen and decrease a clamping force and annular compression applied by clamping band 140 on seat tube 22. It will be readily appreciated that matching a specific direction of rotation of seat adjustment lever 160 or lead screw 110 to be associated with an increasing or decreasing clamping force may be tailored based on at least the choice of direction of angled threads, i.e., the direction or sense in which the threads are formed with a spiral, on first and second screw portions 112-1 and 112-2, respectively, of lead screw 100.

In particular embodiments, seat adjustment lever 160 may be provided with one or more detents, or similar features, to prevent inadvertent rotation from specific positions. Detents, or similar features, may also be used to provide tactile feedback to a user of seat post clamp assembly 100 regarding traversing specific positions along the rotational travel of the seat adjustment lever.

Figure 10A:
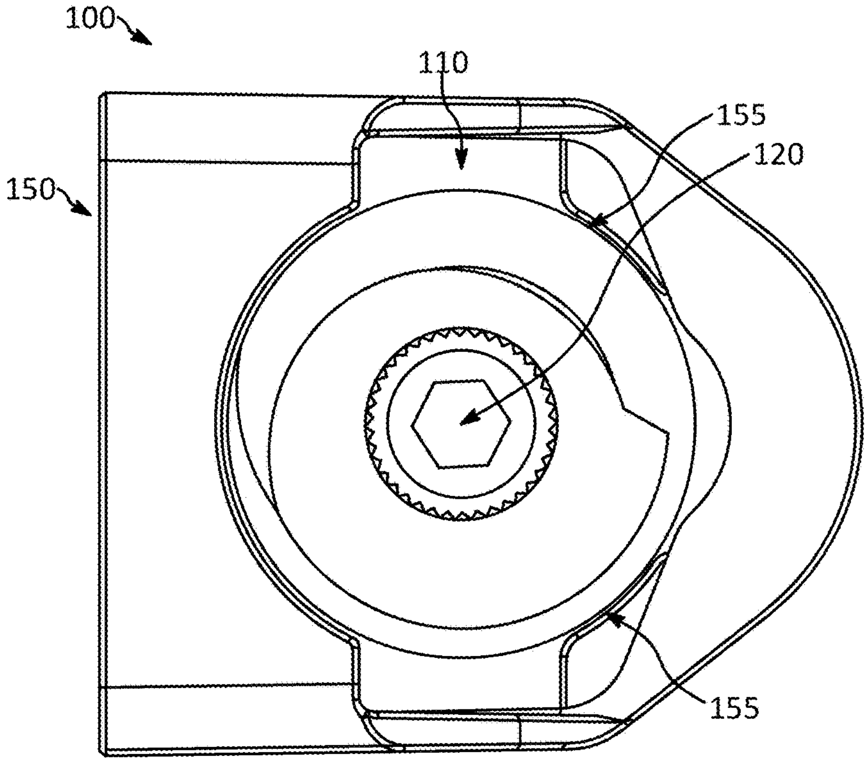
FIGS. 10A-10B illustrate a side view of a housing structure of a seat post clamp assembly, according to particular embodiments.
Figure 10B:
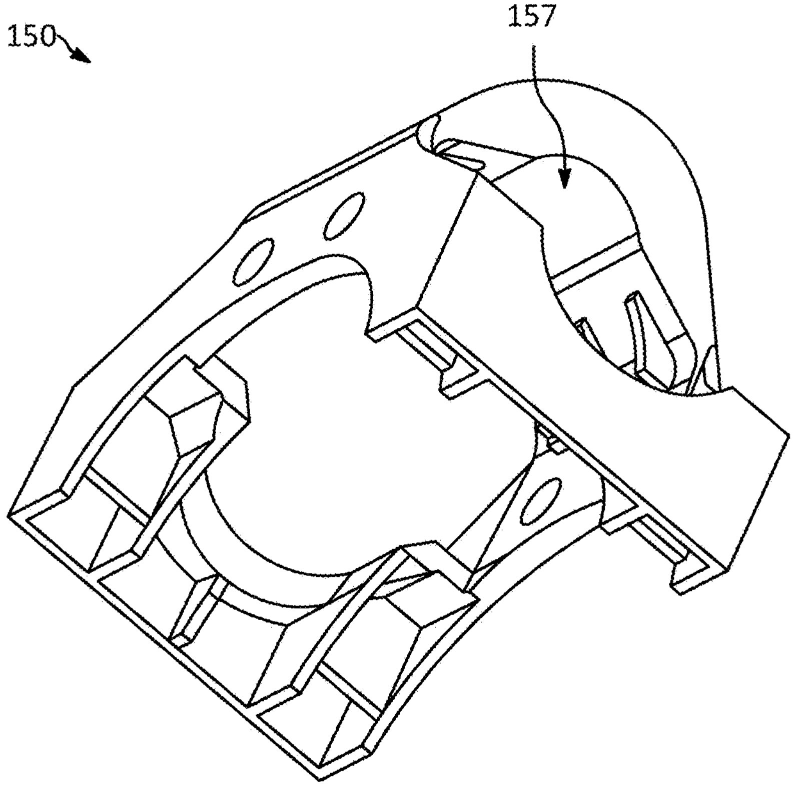

FIGS. 10A-10B illustrate a side view of a housing structure 150 of a seat post clamp assembly 100, according to particular embodiments. FIG. 10A depicts constructional features of housing structure 150, in specific embodiments, to enable assembly of lead screw 110 within the housing structure. By way of example and not limitation, sufficient clearance may be provided in housing structure 150 to insert lead screw 110 without interference, such as at edges 155.

As previously disclosed, one or more specific surfaces of housing structure 150 may be formed to function as bushing or bearing surfaces. In particular embodiments, as illustrated in FIG. 10B, bushing surface 157 of housing structure 150 may function as a bushing for lead screw 110. As a non-limiting example, bushing surface 157 may interface with a part or full extent of unthreaded portion 114 and/or 114-1 of lead screw 110.

In particular embodiments, housing structure 150 may be configured to provide longitudinal alignment and/or support to lead screw 110. In contrast, in particular embodiments, lead screw 110 may comprise screw portions with oppositely directed angled threads, thereby providing longitudinal self-centering of lead screw 110 when rotationally operated. By way of example and not limitation, lead screw 110 may therefore be longitudinally floating, and may locate itself for longitudinal alignment when rotationally operated. In particular embodiments, housing structure 150 or other adjacent structures may not provide, and/or may not need to provide, longitudinal alignment and/or support to lead screw 110.

Figure 11A:
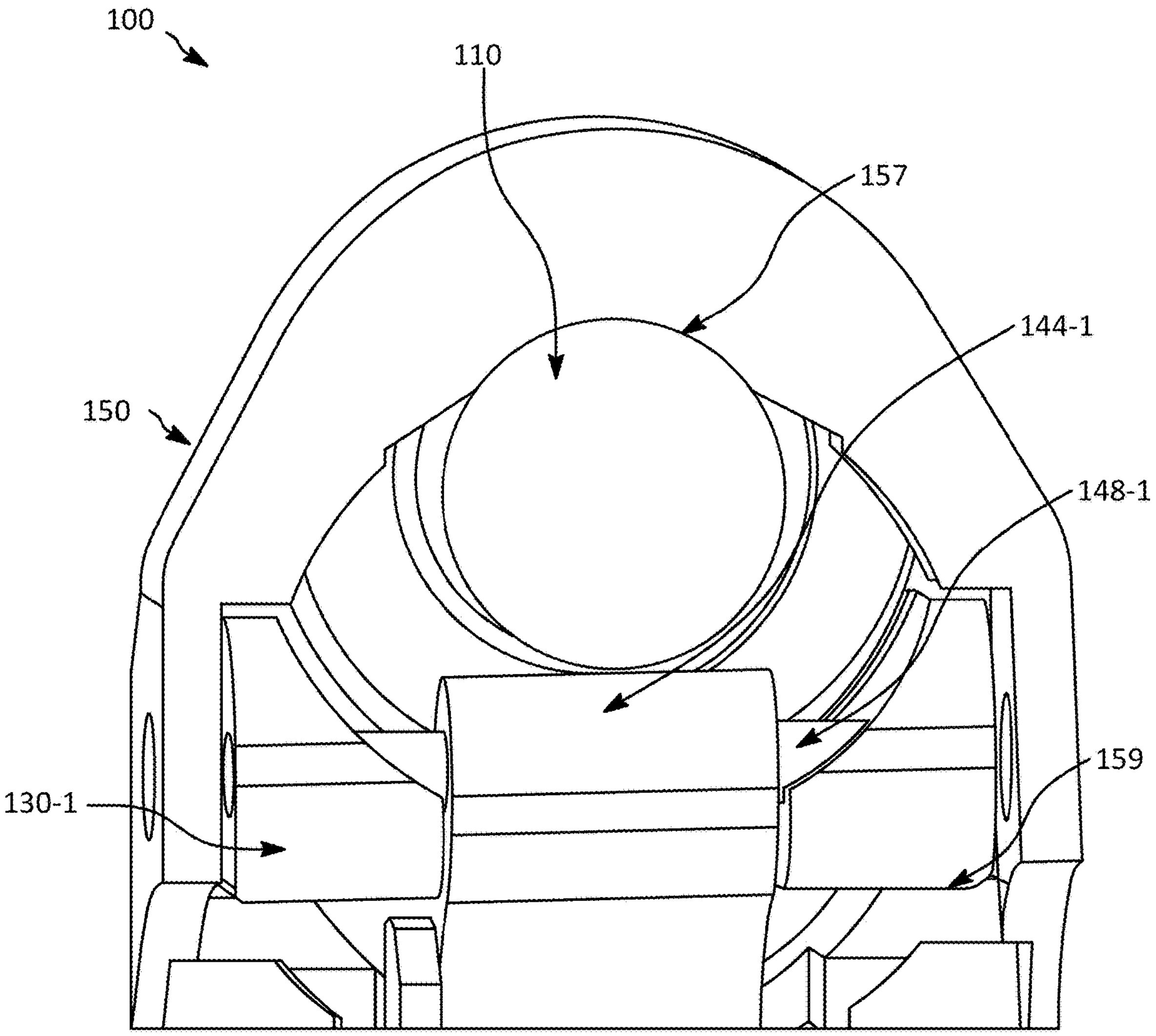
FIGS. 11A-11B illustrate partial sectional and perspective views of a housing structure of a seat post clamp assembly, according to particular embodiments.
Figure 11B:
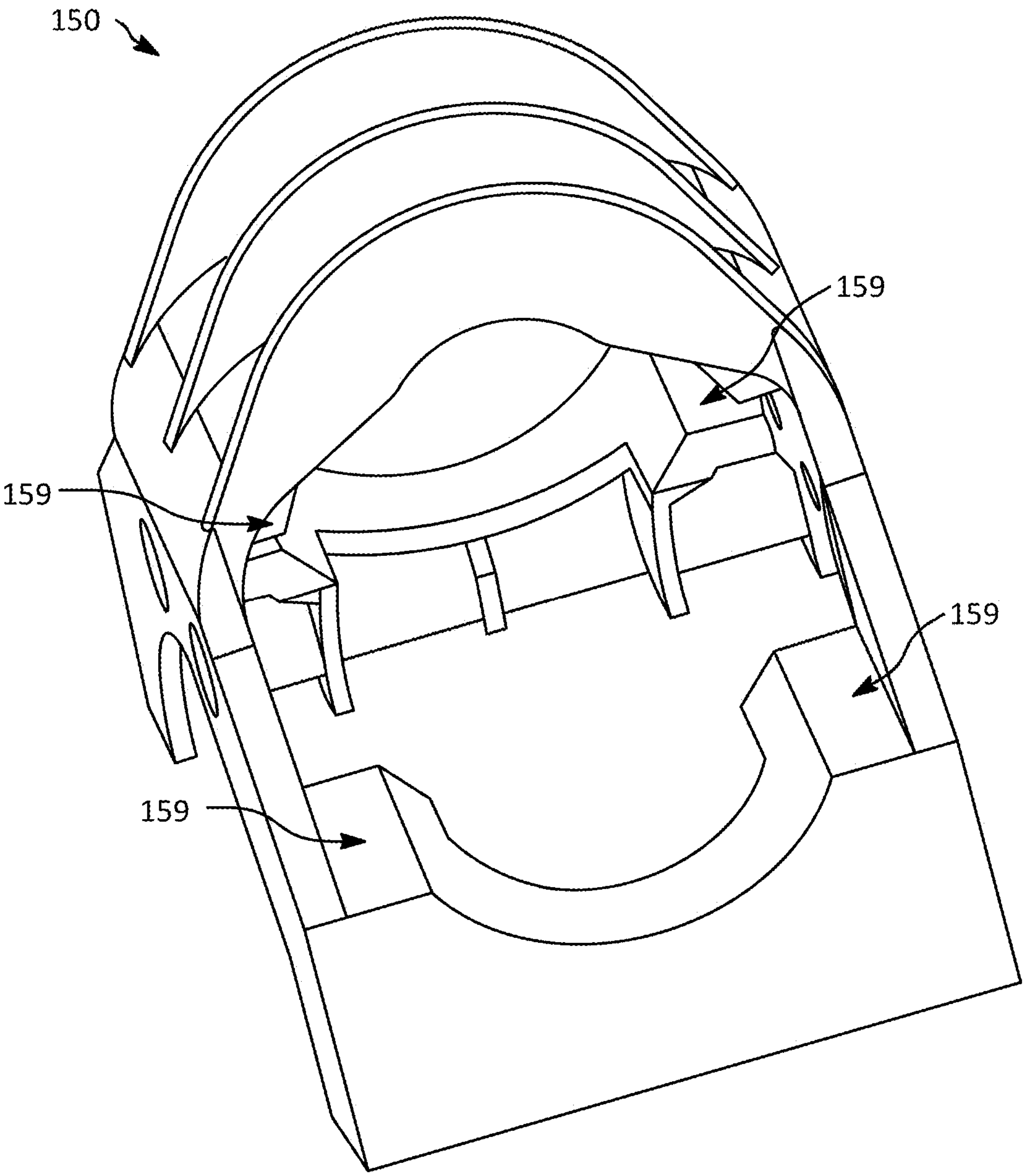

FIGS. 11A-11B illustrate partial sectional and perspective views of a housing structure 150 of a seat post clamp assembly 100, according to particular embodiments. The sectional view of FIG. 11A illustrates another view bushing surface 157 of housing structure 150, which interfaces with the curved rotational surface of lead screw 110. In particular embodiments, translational securing elements 130-1 and 130-2 (only one depicted in this sectional view) may be slidably supported by linear rail surfaces 159. FIG. 11A illustrates the interface edge 159 of a linear rail surface 159. FIG. 11B illustrates several linear rail surfaces 159, which may slidably support translation of securing elements 130-1 and 130-2, in particular embodiments.

Figure 12:
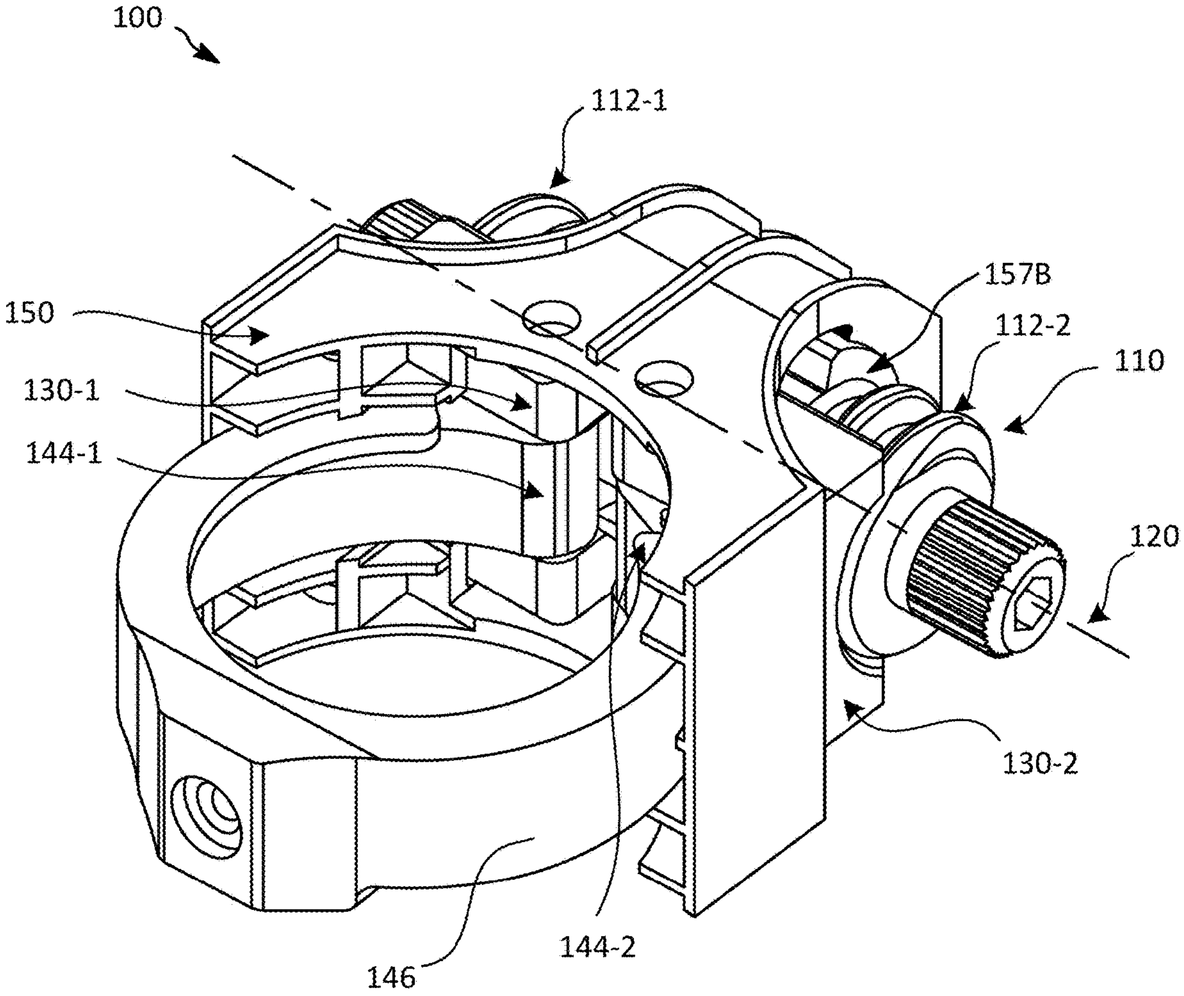
FIG. 12 illustrates a perspective view of a seat post clamp assembly, according to particular embodiments.

FIG. 12 illustrates a perspective view of a seat post clamp assembly 100, according to particular embodiments. While a directly interfacing bushing surface 157 between lead screw 110 and housing structure 150 has been disclosed, in particular embodiments, additional and/or intermediate components may be employed for support, alignment, and/or bushing purposes. As a non-limiting example, FIG. 12 shows additional contact surface 157B located between housing structure 150 and lead screw 110.

FIGS. 13A-13E illustrate partial close-up and sectional views of thread geometry features of a seat post clamp assembly 100, according to particular embodiments.

While the illustrations of FIGS. 13A-13E may depict specific ones of the plurality of screw portions of lead screw 110, it should be appreciated that this disclosure is not restrictive, and may apply to any screw portion of lead screw 110. Additionally, while the illustrations of FIGS. 13A-13E may depict particular directions of thread direction or spiral formation for a screw portion, it should be understood that the depiction is not restrictive, and the disclosure may apply to different thread directions or spiral formations for a screw portion, securing element, or other threaded component of interest.

Figure 13A:
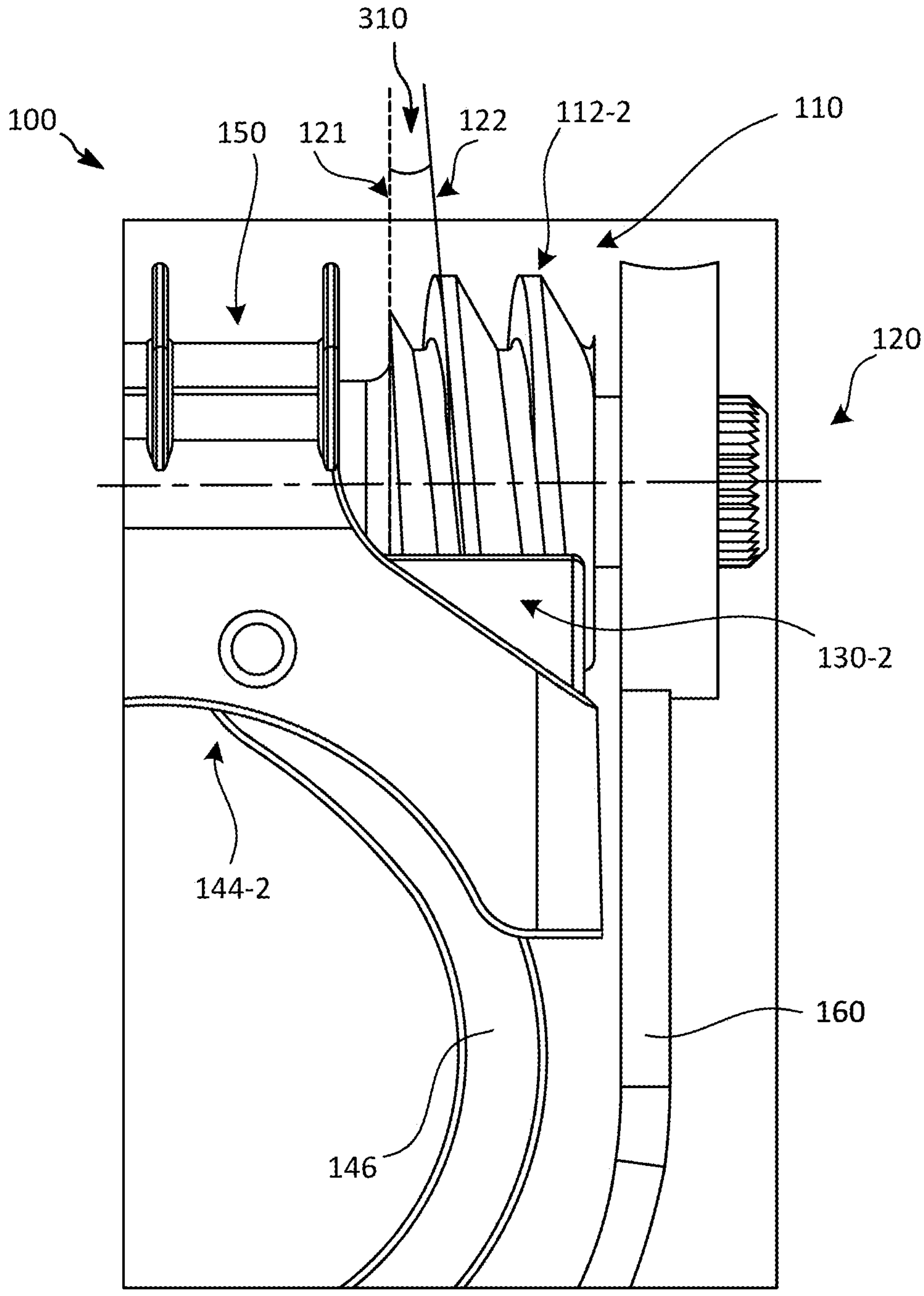
FIGS. 13A-13E illustrate partial close-up and sectional views of thread geometry features of a seat post clamp assembly, according to particular embodiments.

FIG. 13A illustrates a helix angle 310, also called lead angle 310, of angled threads of a screw portion 112-2 of lead screw 110, where helix angle 310 is the angle between the normal direction 121 and the screw flight slope 122, where the normal direction 121 is perpendicular to longitudinal axis 120 of lead screw 110.

As previously discussed, a non-self-locking design of a seat post clamp assembly may lead to "back-driving," wherein external forces acting on the seat post clamp assembly may cause inadvertent rotation of a lead screw and/or a seat adjustment lever. During a back-driving event, a seat post clamp assembly may unintentionally, and possibly suddenly, loosen, and/or release a seat from its secured position and orientation relative to a micromobility vehicle, such as a bicycle. As a non-limiting example, a component such as a seat adjustment lever of sufficient mass with particular orientations, may experience and transfer a sufficient force to a seat post clamp assembly when subjected to a large road surface disturbance to "pop open" a seat post clamp assembly, rotating to loosen the clamping band without direct user input.

An appropriate selection of helix angle 310, along with careful consideration of some or all of the following factors may permit seat post clamp assembly 100 to be self-locking by design: material properties and/or surface properties of the threads and interfacing parts; use and type of lubrication; condition, wear, and evolution of these properties over the operating life of seat post clamp assembly 100. By way of example and not limitation, a helix angle 310 may be greater than 0° and less than 8°. In particular embodiments, a helix angle 310 may be greater than 3° and less than 6°. In particular embodiments, a helix angle 310 may be about 4°. In particular embodiments, seat post clamp assembly 100 may be self-locking, providing sufficient resistance to prevent back-driving. Separately or additional, in particular embodiments, seat post clamp assembly 100 may enable a consistent torque application requirement for rotating seat adjustment lever 160 to loosen or tighten clamping band 140 on seat tube 22.

Among other factors, helix angle 310 may also determine the rate of linear translation of securing elements 130-1 and 130-2 for a given rotation angle of seat adjustment lever 160 or lead screw 110. In particular embodiments, as a non-limiting example, securing elements 130-1 and 130-2 may each translate about 2 mm for about 70° rotation angle of seat adjustment lever 160 or lead screw 110.

In some embodiments, the angled threads of a screw portion 112-1 and 112-2, and/or securing elements 130-1 and 130-2, may be made of zinc alloy. As a non-limiting example, zinc alloy may be high-pressure diecast for manufacturing the above-mentioned parts of seat post clamp assembly 100.

In particular embodiments, the angled threads of a screw portion 112-1 and 112-2 may form a double-threaded screw. Among other benefits, a double-threaded feature may provide structural redundancy.

Figure 13B:
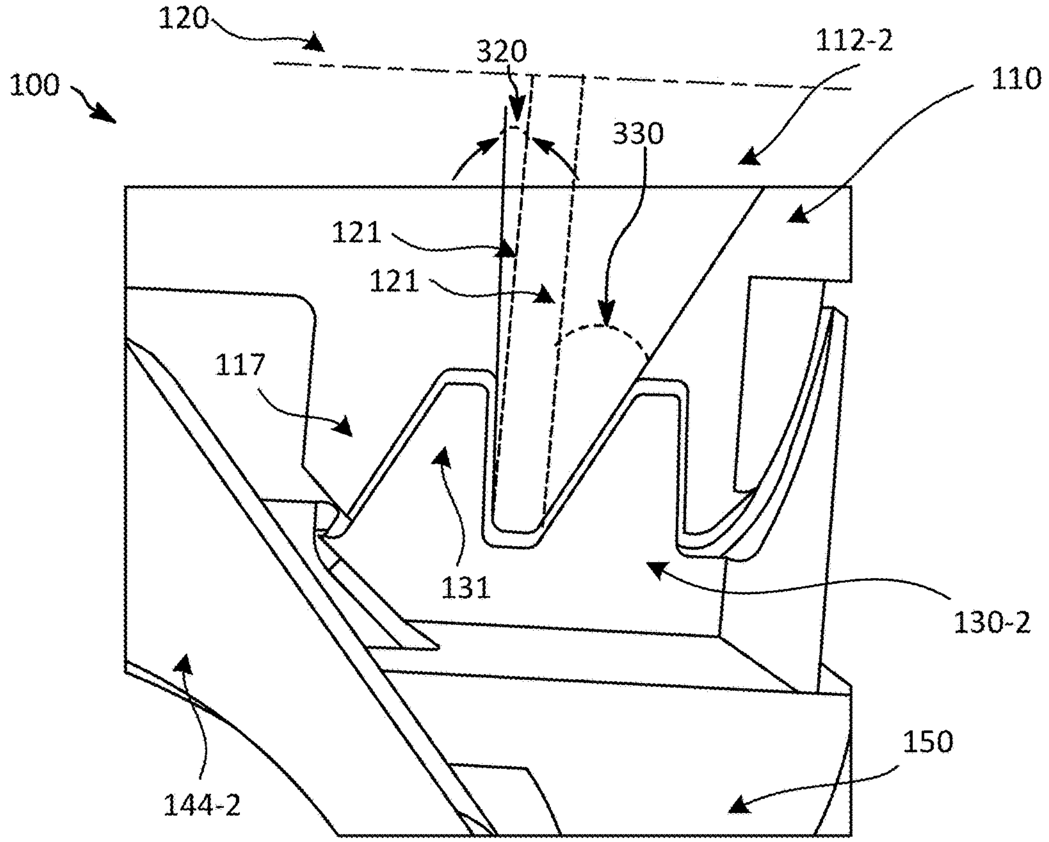
Figure 13C:
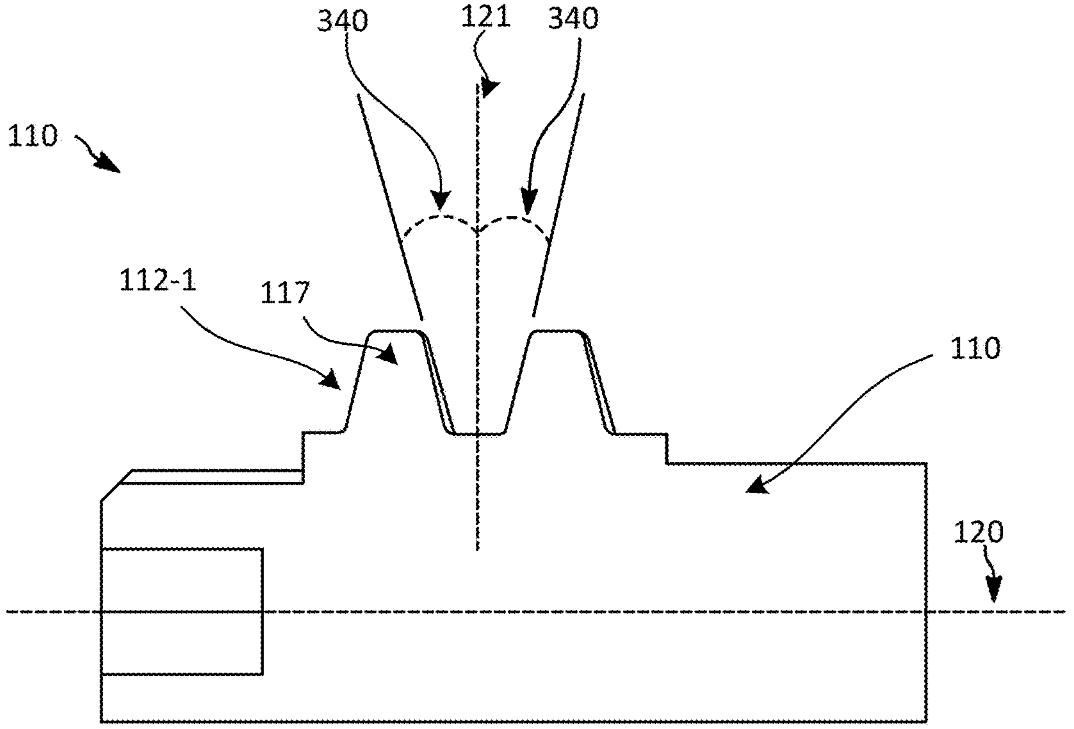

FIGS. 13B and 13C illustrate thread features and geometry for an asymmetric thread profile (FIG. 13B) and a symmetric thread profile (FIG. 13C). For the purpose of this discussion, either or both of engaging threads of lead screw 110 and securing elements 130-2 (or 130-1) may be usefully discussed, as they are compatible for engagement within a particular embodiment of a seat post clamp assembly 100.

FIG. 13B illustrates an asymmetric thread profile, such as profile 131 of securing element 130-2 or profile 117 of screw portion 112-2 of lead screw 110, wherein an angle 320 of one side of the thread profile does not equal an angle 330 of the other side of the thread profile. Each angle 320 and 330 of the thread profile is measured relative to normal direction 121, where the normal direction 121 is perpendicular to longitudinal axis 120 of lead screw 110. In particular embodiments, an asymmetric thread profile may provide structural strength benefits, among other benefits.

In particular embodiments, screw portions 130-1 and 130-2 of lead screw 110 are lead screws or worm screws. In particular embodiments, the thread profile of lead screw 110 forms a buttress thread. In particular embodiments, angle 320 is about 3°. In particular embodiments, angle 330 is about 30°.

As previously discussed, lead screw 110 may be longitudinally self-centering when rotationally operated. In other words, counteracting forces along the longitudinal axis 120 may keep the lead screw 110 automatically centered relative to the seat post clamp assembly 100. In some embodiments, a careful selection of angle 320 may separately or additionally provide radial self-centering to lead screw 110 when rotationally operated. Differently described, a radial component of force may be generated based on angle 320 when lead screw 110 is rotated, and may be balanced by a counteracting force, such as a reaction force from a bushing surface interfacing with lead screw 110, so as to keep lead screw 110 correctly radially centered about longitudinal axis 120.

FIG. 13C illustrates a symmetric thread profile, such as profile 117 of screw portion 112-1 of lead screw 110, wherein an angle 340 of one side of the thread profile equals an angle 340 of the other side of the thread profile. Each angle 340 of the thread profile is measured relative to normal direction 121, where the normal direction 121 is perpendicular to longitudinal axis 120 of lead screw 110. Angle 340 may also be called pressure angle, and/or angle α (alpha). As discussed above, decreasing pressure angle may reduce radial forces.

Figure 13E:
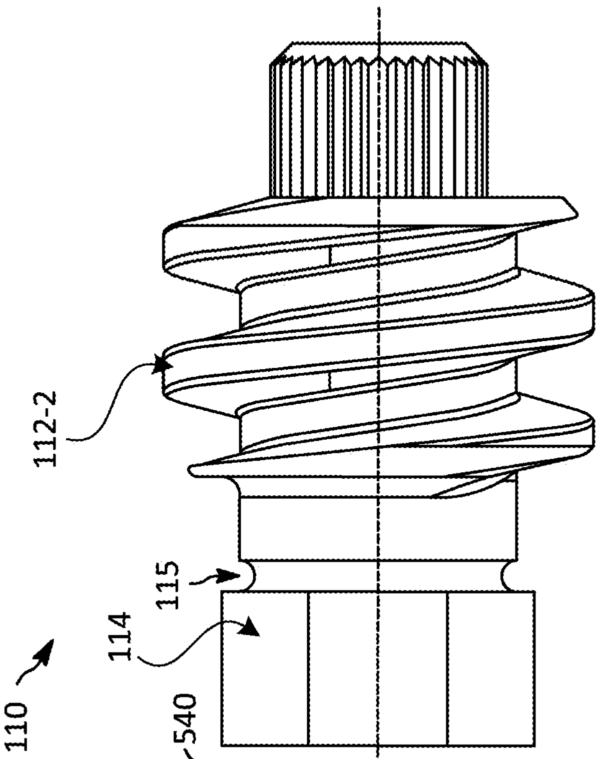
Figure 13D:
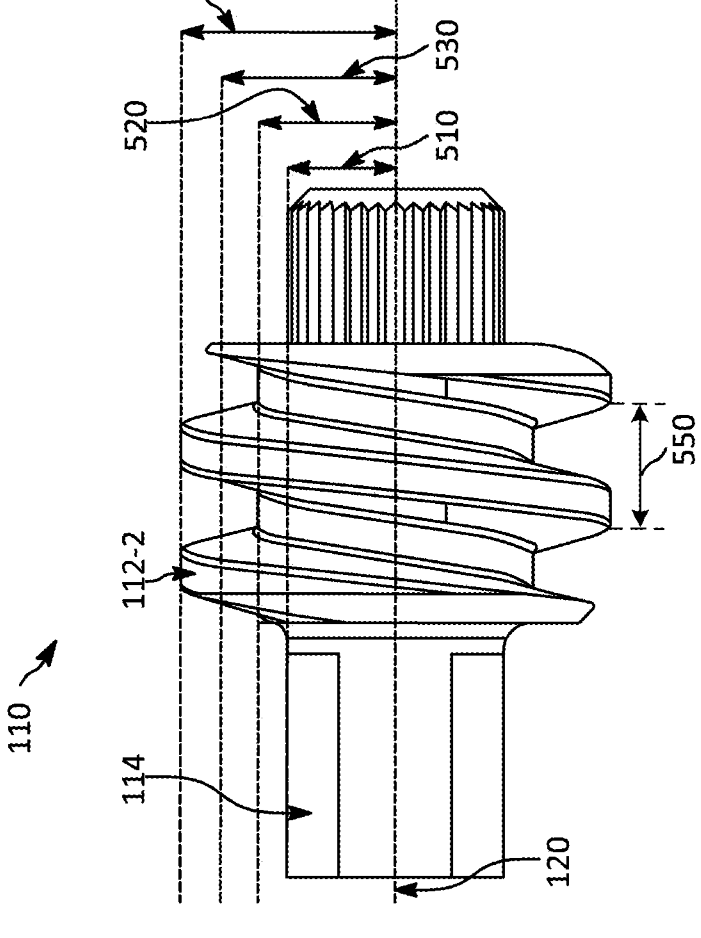

FIGS. 13D and 13E illustrate additional dimensions of interest for lead screw 110, defining a shaft radius 510, a thread minor radius 520, a thread pitch radius 530, and a thread major radius 540, which may be based on the shaft radius of unthreaded portion 114, the thread root radius, the thread pitch radius, and the thread tip radius, respectively, each measured from longitudinal axis 120 of lead screw 110. FIG. 13D also illustrates thread pitch 550 of lead screw 110. In particular embodiments, shaft radius 510 may be less than or equal to thread minor radius 520.

In particular embodiments, shaft radius 510 may be greater than thread minor radius 520, and an overcutting clearance 115 may be provided between unthreaded portion 114 and screw portion 112-1 and/or 112-2 of lead screw 110.

As discussed previously, in particular embodiments, offset distance 850 may permit the desirable application of clamping forces by clamping band 140 on seat post tube 22 as close as possible to seat tube 22. Separately or additionally, as the lead screw 110 may be further physically offset or separated from seat tube 22 based on at least offset distance 850, particular embodiments may employ screw portions 112-1 and 112-2 of lead screw 110 with a larger thread pitch radius 530 in a compact physical packaging than may be otherwise feasible, and/or without undesirably an increasing effective distance of clamping application on seat tube 22, as has been previously discussed herein. As non-limiting examples, as illustrated in at least FIG. 8B, increasing a thread pitch radius within fixed packaging constraints may be limited by potential mechanical interference of lead screw 110 with other components, such as seat tube 22 and/or clamping band 140.

Consequently, as a non-limiting example, offset distance 850 may enable screw portions 112-1 and 112-2 of lead screw 110 to be provided with an increased thread pitch radius 530 relative to thread pitch 550, so as to form a lead angle 310 or helix angle 310 suitable for enabling seat post clamp assembly 100 to be self-locking. Separately or additionally, the ability to use a relatively large thread pitch radius 530 based on at least offset distance 850 may enable a suitable effective gearing ratio for user operation of seat post clamp assembly 100, such that a relatively large rate of traversing distance of first and second ends 144-1 and 144-2, respectively, of clamping band 140 toward or away from each other may be accomplished for a relatively small rotation and/or rotational range of seat adjustment lever 160 by the user, and/or a relatively lower force required from the user to securely clamp seat 6.

In particular embodiments, thread profiles of a seat post clamp assembly 100 may comprise stub teeth, i.e., teeth of specifically reduced height. Such stub teeth may reduce cantilever loading on teeth of the thread profile, and prevent thin sections at teeth tips.

Figure 14:
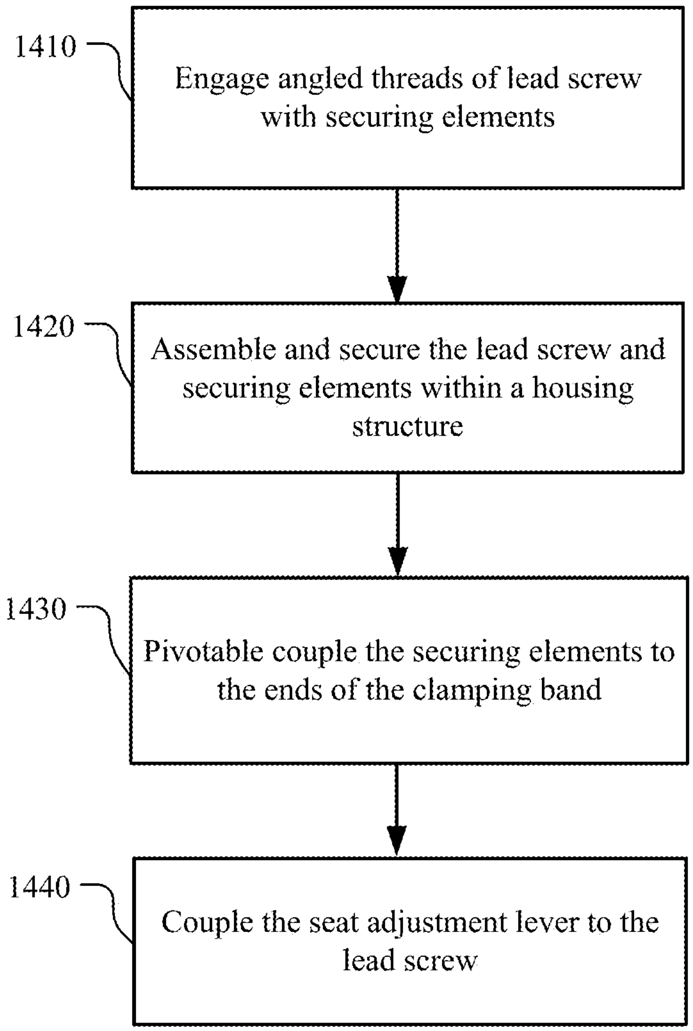
FIG. 14 illustrates a method for assembling a seat post clamp assembly for a micromobility vehicle, according to particular embodiments.

FIG. 14 illustrates a method for assembling a seat post clamp assembly for a micromobility vehicle, according to particular embodiments. In a first step 1410, a first and a second set of angled threads of a lead screw 110 may be engaged with a first and a second securing element 130-1 and 130-2, respectively, the lead screw being rotatable about a longitudinal axis 120. In particular embodiments, the first and second sets of angled threads may be formed with spirals in opposite directions to each other.

In a second step 1420, lead screw 110 and securing elements 130-1 and 130-2 may be assembled and secured within a housing structure 150.

In a third step 1430, first and second securing elements 130-1 and 130-2 may be pivotable coupled to first and second ends 144-1 and 144-2 of clamping band 140, respectively. In particular embodiments, clamping band 140 may be coupled to seat adjustment lever 160, wherein clamping band 140 may be configured to secure seat post clamp assembly 100 to seat tube 22 of a micromobility vehicle.

In particular embodiments, a step 1440 may follow the third step 1430, wherein seat adjustment lever 160 may be coupled to lead screw 110.

Figure 15:
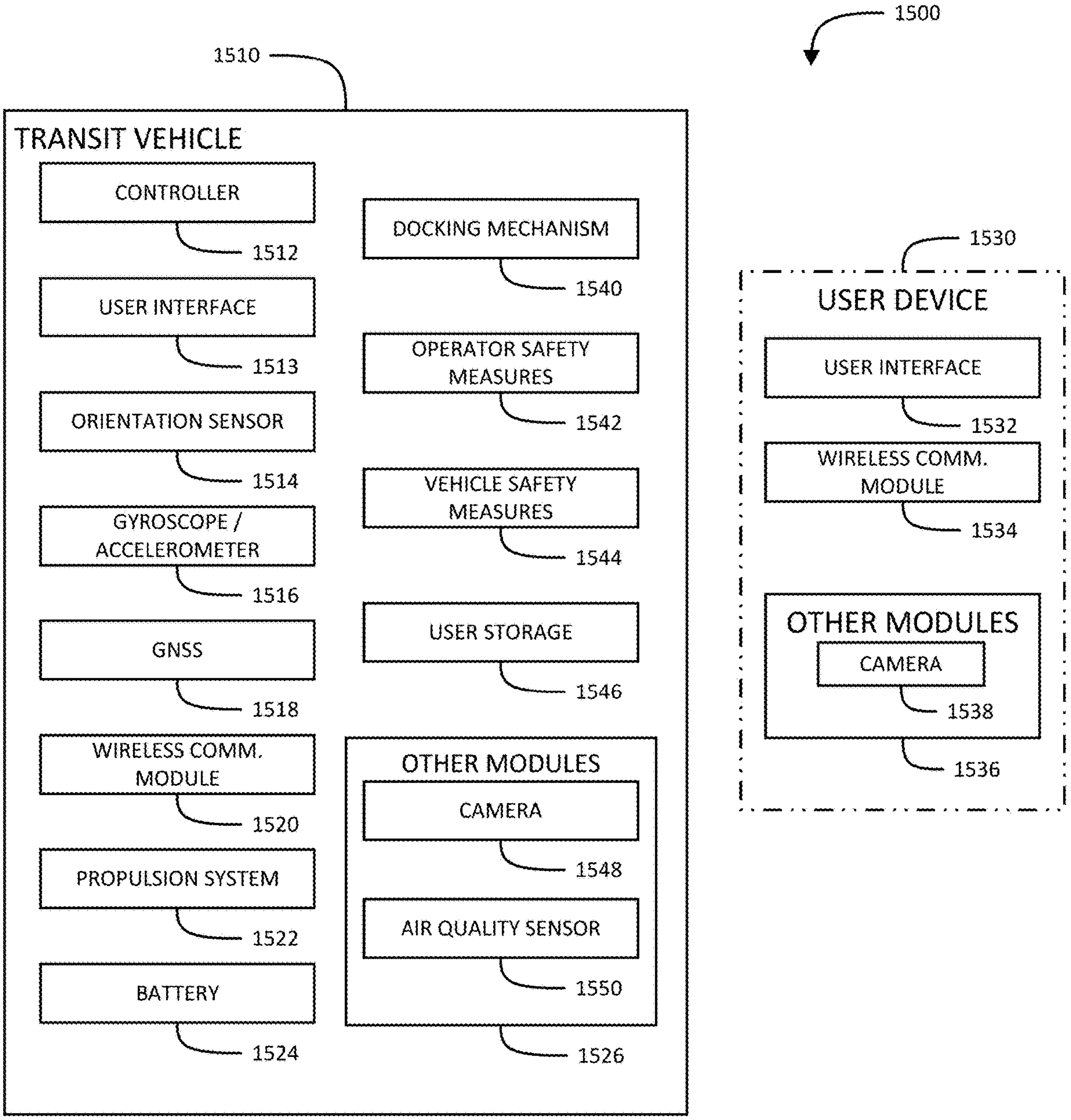
FIG. 15 illustrates a block diagram of a portion of a dynamic transportation matching system including a micromobility transit vehicle, according to particular embodiments.

FIG. 15 illustrates a block diagram of a portion of a dynamic transportation matching system 1500 including a transit vehicle 1510. In the embodiment shown in FIG. 15, system 1500 may include transit vehicle 1510 and an optional user device 1530. In general, transit vehicle 1510 may be a passenger vehicle designed to transport a single person (e.g., a mobility transit vehicle, a transit bike and scooter vehicle, or the like) or a group of people (e.g., a typical car or truck). Transit vehicle 1510 may be implemented as a motorized or electric kick scooter, bicycle, and/or motor scooter designed to transport one or more people at once typically on a paved road (collectively, mobility transit vehicles). Transit vehicle 1510 may be implemented as an automobile configured to transport up to 4, 7, 10, or more people at once, or according to a variety of different transportation modalities (e.g., transportation mechanisms). Transit vehicles similar to transit vehicle 1510 may be owned, managed, and/or serviced primarily by a fleet manager/servicer providing transit vehicle 1510 for use by the public as one or more types of transportation modalities offered by a dynamic transportation matching system, for example. In some embodiments, transit vehicles similar to transit vehicle 1510 may be owned, managed, and/or serviced by a private owner using the dynamic transportation matching system to match their vehicle to a transportation request, such as with ridesharing or ride-sourcing applications typically executed on a mobile user device, such as user device 1530 as described herein. User device 1530 may be a smartphone, tablet, near field communication (NFC) or radio-frequency identification (RFID) enabled smart card, or other personal or portable computing and/or communication device that may be used to facilitate rental and/or operation of transit vehicle 1510.

As shown in FIG. 15, transit vehicle 1510 may include one or more of a controller 1512, a user interface 1513, an orientation sensor 1514, a gyroscope/accelerometer 1516, a global navigation satellite system (GNSS) receiver 1518, a wireless communications module 1520, a camera 1548, a propulsion system 1522, an air quality sensor 1550, and other modules 1526. Operation of transit vehicle 1510 may be substantially manual, autonomous, and/or partially or completely controlled by user device 1530, which may include one or more of a user interface 1532, a wireless communications module 1534, a camera 1538, and other modules 1536. In other embodiments, transit vehicle 1510 may include any one or more of the elements of user device 1530. In some embodiments, one or more of the elements of system 1500 may be implemented in a combined housing or structure that can be coupled to or within transit vehicle 1510 and/or held or carried by a user of system 1500.

Controller 1512 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 1510 and/or other elements of system 1500, for example. Such software instructions may also implement methods for processing images such as those provided by camera 1548, and/or other sensor signals or data, determining sensor information, providing user feedback (e.g., through user interface 1513 or 1532), querying devices for operational parameters, selecting operational parameters for devices, or performing any of the various operations described herein (e.g., operations performed by logic devices of various devices of system 1500).

In addition, a non-transitory medium may be provided for storing machine readable instructions for loading into and execution by controller 1512. In these and other embodiments, controller 1512 may be implemented with other components where appropriate, such as volatile memory, non-volatile memory, one or more interfaces, and/or various analog and/or digital components for interfacing with devices of system 1500. For example, controller 1512 may be adapted to store sensor signals, sensor information, parameters for coordinate frame transformations, calibration parameters, sets of calibration points, and/or other operational parameters, over time, for example, and provide such stored data to a user via user interface 1513 or 1532. In some embodiments, controller 1512 may be integrated with one or more other elements of transit vehicle 1510, for example, or distributed as multiple logic devices within transit vehicle 1510 and/or user device 1530.

In some embodiments, controller 1512 may be configured to substantially continuously monitor and/or store the status of and/or sensor data provided by one or more elements of transit vehicle 1510 and/or user device 1530, such as the position and/or orientation of transit vehicle 1510 and/or user device 1530, for example, and the status of a communication link established between transit vehicle 1510 and/or user device 1530. Such communication links may be established and then provide for transmission of data between elements of system 1500 substantially continuously throughout operation of system 1500, where such data includes various types of sensor data, control parameters, and/or other data.

User interface 1513 of transit vehicle 1510 may be implemented as one or more of a display, a touch screen, a keyboard, a mouse, a joystick, a knob, a steering wheel, a yoke, and/or any other device capable of accepting user input and/or providing feedback to a user. In various embodiments, user interface 1513 may be adapted to provide user input (e.g., as a type of signal and/or sensor information transmitted by wireless communications module 1534 of user device 1530) to other devices of system 1500, such as controller 1512. User interface 1513 may also be implemented with one or more logic devices (e.g., similar to controller 1512) that may be adapted to store and/or execute instructions, such as software instructions, implementing any of the various processes and/or methods described herein. For example, user interface 1513 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 1513 may be adapted to display a time series of various sensor information and/or other parameters as part of or overlaid on a graph or map, which may be referenced to a position and/or orientation of transit vehicle 1510 and/or other elements of system 1500. For example, user interface 1513 may be adapted to display a time series of positions, headings, and/or orientations of transit vehicle 1510 and/or other elements of system 1500 overlaid on a geographical map, which may include one or more graphs indicating a corresponding time series of actuator control signals, sensor information, and/or other sensor and/or control signals. In some embodiments, user interface 1513 may be adapted to accept user input including a user-defined target heading, waypoint, route, and/or orientation, for example, and to generate control signals to cause transit vehicle 1510 to move according to the target heading, route, and/or orientation. In other embodiments, user interface 1513 may be adapted to accept user input modifying a control loop parameter of controller 1512, for example.

Orientation sensor 1514 may be implemented as one or more of a compass, float, accelerometer, and/or other device capable of measuring an orientation of transit vehicle 1510 (e.g., magnitude and direction of roll, pitch, and/or yaw, relative to one or more reference orientations such as gravity and/or Magnetic North), camera 1548, and/or other elements of system 1500, and providing such measurements as sensor signals and/or data that may be communicated to various devices of system 1500. Gyroscope/accelerometer 1516 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 1510 and/or other elements of system 1500 and providing such measurements as sensor signals and/or data that may be communicated to other devices of system 1500 (e.g., user interface 1532, controller 1512).

GNSS receiver 1518 may be implemented according to any global navigation satellite system, including a GPS, GLONASS, and/or Galileo based receiver and/or other device capable of determining absolute and/or relative position of transit vehicle 1510 (e.g., or an element of transit vehicle 1510) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 1500. In some embodiments, GNSS receiver 1518 may include an altimeter, for example, or may be used to provide an absolute altitude.

Wireless communications module 1520 may be implemented as any wireless communications module configured to transmit and receive analog and/or digital signals between elements of system 1500. For example, wireless communications module 1520 may be configured to directly or indirectly receive control signals and/or data from user device 1530 and provide them to controller 1512 and/or propulsion system 1522. In other embodiments, wireless communications module 1520 may be configured to receive images and/or other sensor information (e.g., still images or video images) and relay the sensor data to controller 1512 and/or user device 1530. In some embodiments, wireless communications module 1520 may be configured to support spread spectrum transmissions, for example, and/or multiple simultaneous communications channels between elements of system 1500. Wireless communication links formed by wireless communications module 1520 may include one or more analog and/or digital radio communication links, such as WiFi, Bluetooth, NFC, RFID, LTE, and others, as described herein, and may be direct communication links established between elements of system 1500, for example, or may be relayed through one or more wireless relay stations configured to receive and retransmit wireless communications. In various embodiments, wireless communications module 1520 may be configured to support wireless mesh networking, as described herein.

In some embodiments, wireless communications module 1520 may be configured to be physically coupled to transit vehicle 1510 and to monitor the status of a communication link directly or indirectly established between transit vehicle 1510 and/or user device 1530. Such status information may be provided to controller 1512, for example, or transmitted to other elements of system 1500 for monitoring, storage, or further processing, as described herein. In addition, wireless communications module 1520 may be configured to determine a range to another device, such as based on time of flight, and provide such range to the other device and/or controller 1512. Communication links established by communication module 1520 may be configured to transmit data between elements of system 1500 substantially continuously throughout operation of system 1500, where such data includes various types of sensor data, control parameters, and/or other data, as described herein.

Propulsion system 1522 may be implemented as one or more motor-based propulsion systems, and/or other types of propulsion systems that can be used to provide motive force to transit vehicle 1510 and/or to steer transit vehicle 1510. In some embodiments, propulsion system 1522 may include elements that can be controlled (e.g., by controller 1512 and/or user interface 1513) to provide motion for transit vehicle 1510 and to provide an orientation for transit vehicle

1510. In various embodiments, propulsion system 1522 may be implemented with a portable power supply, such as a battery. In some embodiments, propulsion system 1522 may be implemented with a combustion engine/generator and fuel supply.

For example, in some embodiments, such as when propulsion system 1522 is implemented by an electric motor (e.g., as with many mobility transit vehicles), transit vehicle 1510 may include battery 1524. Battery 1524 may be implemented by one or more battery cells (e.g., lithium ion battery cells) and be configured to provide electrical power to propulsion system 1522 to propel transit vehicle 1510, for example, as well as to various other elements of system 1500, including controller 1512, user interface 1513, and/or wireless communications module 1520. In some embodiments, battery 1524 may be implemented with its own safety measures, such as thermal interlocks and a fire-resistant enclosure, for example, and may include one or more logic devices, sensors, and/or a display to monitor and provide visual feedback of a charge status of battery 1524 (e.g., a charge percentage, a low charge indicator, etc.).

Other modules 1526 may include other and/or additional sensors, actuators, communications modules/nodes, and/or user interface devices, for example, and may be used to provide additional environmental information related to operation of transit vehicle 1510, for example. In some embodiments, other modules 1526 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 1500 (e.g., controller 1512) to provide operational control of transit vehicle 1510 and/or system 1500. In further embodiments, other modules 1526 may include a light, such as a headlight or indicator light, and/or an audible alarm, both of which may be activated to alert passersby to possible theft, abandonment, and/or other critical statuses of transit vehicle 1510. In particular, and as shown in FIG. 15, other modules 1526 may include camera 1548 and/or air quality sensor 1550.

Camera 1548 may be implemented as an imaging device including an imaging module including an array of detector elements that can be arranged in a focal plane array. In various embodiments, camera 1548 may include one or more logic devices (e.g., similar to controller 1512) that can be configured to process imagery captured by detector elements of camera 1548 before providing the imagery to communications module 1520 or other elements of the system 1500. More generally, camera 1548 may be configured to perform any of the operations or methods described herein, at least in part, or in combination with controller 1512 and/or user interface 1513 or 1532. In some embodiments, camera 1548 may be a visible light imager and/or thermal imager.

In various embodiments, air quality sensor 1550 may be implemented as an air sampling sensor configured to determine an air quality of an environment about transit vehicle 1510 and provide corresponding air quality sensor data. Air quality sensor data provided by air quality sensor 1550 may include particulate count, methane content, ozone content, and/or other air quality sensor data associated with common street level sensitivities and/or health monitoring typical when in a street level environment, such as that experienced when riding on a typical mobility transit vehicle, as described herein.

Transit vehicles implemented as mobility transit vehicles may include a variety of additional features designed to facilitate fleet management and user and environmental safety. For example, as shown in FIG. 15, transit vehicle 1510 may include one or more of docking mechanism 1540, operator safety measures 1542, vehicle security device 1544, and/or user storage 1546, as described in more detail herein by reference to FIGS. 17-18.

User interface 1532 of user device 1530 may be implemented as one or more of a display, a touch screen, a keyboard, a mouse, a joystick, a knob, a steering wheel, a yoke, and/or any other device capable of accepting user input and/or providing feedback to a user. In various embodiments, user interface 1532 may be adapted to provide user input (e.g., as a type of signal and/or sensor information transmitted by wireless communications module 1534 of user device 1530) to other devices of system 1500, such as controller 1512. User interface 1532 may also be implemented with one or more logic devices (e.g., similar to controller 1512) that may be adapted to store and/or execute instructions, such as software instructions, implementing any of the various processes and/or methods described herein. For example, user interface 1532 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 1532 may be adapted to display a time series of various sensor information and/or other parameters as part of or overlaid on a graph or map, which may be referenced to a position and/or orientation of transit vehicle 1510 and/or other elements of system 1500. For example, user interface 1532 may be adapted to display a time series of positions, headings, and/or orientations of transit vehicle 1510 and/or other elements of system 1500 overlaid on a geographical map, which may include one or more graphs indicating a corresponding time series of actuator control signals, sensor information, and/or other sensor and/or control signals. In some embodiments, user interface 1532 may be adapted to accept user input including a user-defined target heading, waypoint, route, and/or orientation, for example, and to generate control signals to cause transit vehicle 1510 to move according to the target heading, route, and/or orientation. In other embodiments, user interface 1532 may be adapted to accept user input modifying a control loop parameter of controller 1512, for example.

Wireless communications module 1534 may be implemented as any wireless communications module configured to transmit and receive analog and/or digital signals between elements of system 1500. For example, wireless communications module 1534 may be configured to directly or indirectly transmit control signals from user interface 1532 to wireless communications module 1520 or 1534. In some embodiments, wireless communications module 1534 may be configured to support spread spectrum transmissions, for example, and/or multiple simultaneous communications channels between elements of system 1500. In various embodiments, wireless communications module 1534 may be configured to monitor the status of a communication link established between user device 1530 and/or transit vehicle 1510 (e.g., including packet loss of transmitted and received data between elements of system 1500, such as with digital communication links), and/or determine a range to another device, as described herein. Such status information may be provided to user interface 1532, for example, or transmitted to other elements of system 1500 for monitoring, storage, or further processing, as described herein. In various embodiments, wireless communications module 1534 may be configured to support wireless mesh networking, as described herein.

Other modules 1536 of user device 1530 may include other and/or additional sensors, actuators, communications modules/nodes, and/or user interface devices used to provide additional environmental information associated with user device 1530, for example. In some embodiments, other modules 1536 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 1500 (e.g., controller 1512) to provide operational control of transit vehicle 1510 and/or system 1500 or to process sensor data to compensate for environmental conditions. As shown in FIG. 10, other modules 1536 may include camera 1538.

Camera 1538 may be implemented as an imaging device including an imaging module including an array of detector elements that can be arranged in a focal plane array. In various embodiments, camera 1538 may include one or more logic devices (e.g., similar to controller 1512) that can be configured to process imagery captured by detector elements of camera 1538 before providing the imagery to communications module 1520. More generally, camera 1538 may be configured to perform any of the operations or methods described herein, at least in part, or in combination with controller 1538 and/or user interface 1513 or 1532.

In general, each of the elements of system 1500 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 1500.

In addition, one or more non-transitory mediums may be provided for storing machine readable instructions for loading into and execution by any logic device implemented with one or more of the devices of system 1500. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 11149.1 standard test access port and boundary-scan architecture), and/or other interfaces, such as an interface for one or more antennas, or an interface for a particular type of sensor).

Sensor signals, control signals, and other signals may be communicated among elements of system 1500 and/or elements of other systems similar to system 1500 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 1500 may include one or more modules supporting wired, wireless, and/or a combination of wired and wireless communication techniques, including wireless mesh networking techniques.

In some embodiments, various elements or portions of elements of system 1500 may be integrated with each other, for example, or may be integrated onto a single printed circuit board (PCB) to reduce system complexity, manufacturing costs, power requirements, coordinate frame errors, and/or timing errors between the various sensor measurements.

Each element of system 1500 may include one or more batteries, capacitors, or other electrical power storage devices, for example, and may include one or more solar cell modules or other electrical power generating devices. In some embodiments, one or more of the devices may be powered by a power source for transit vehicle 1510, using one or more power leads. Such power leads may also be used to support one or more communication techniques between elements of system 1500.

Figure 16:
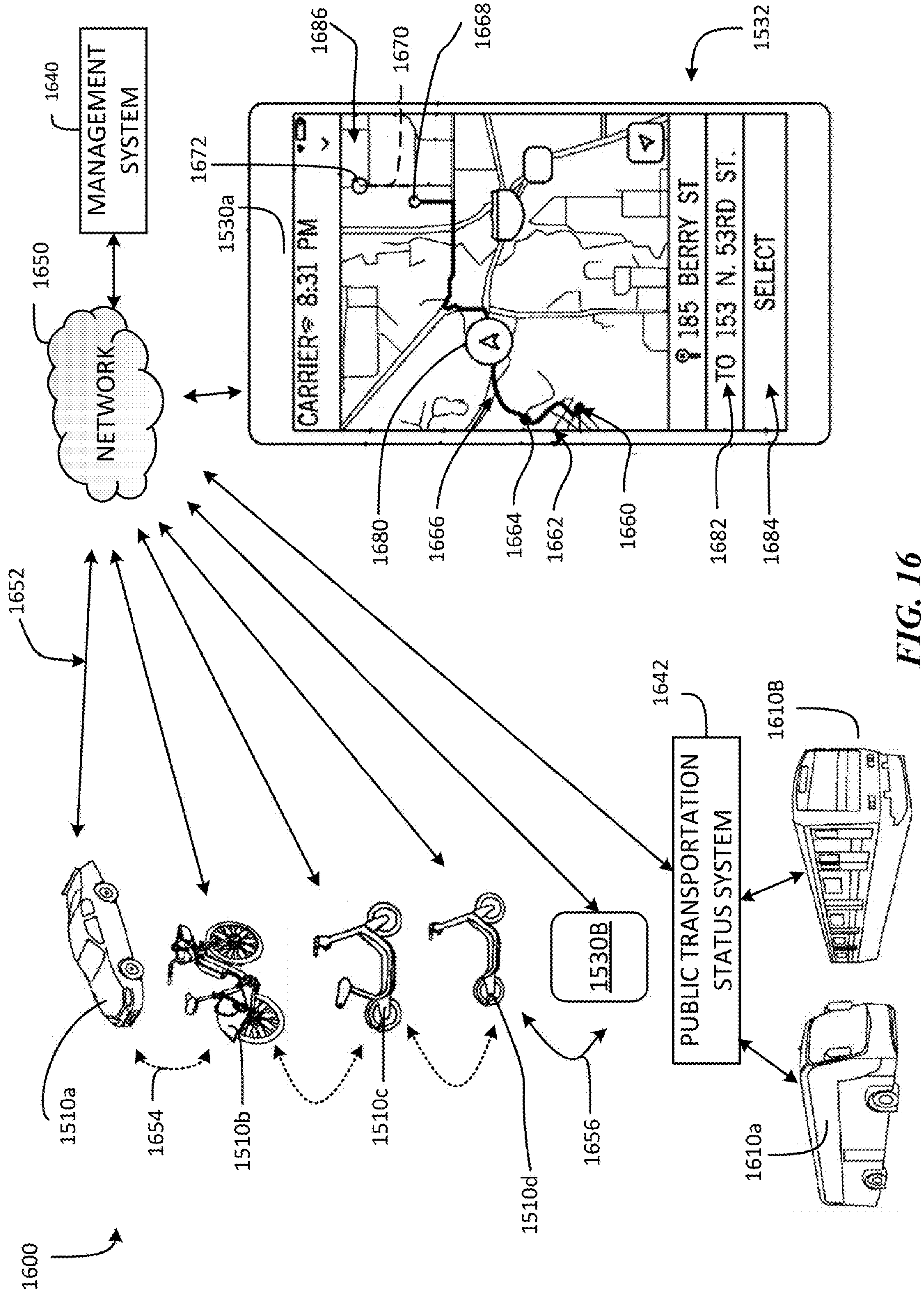
FIG. 16 illustrates a block diagram of a dynamic transportation matching system incorporating a variety of transportation modalities, according to particular embodiments.

FIG. 16 illustrates a diagram of a dynamic transportation matching system 1600 incorporating a variety of transportation modalities. For example, as shown in FIG. 15, dynamic transportation matching system 1600 may include multiple embodiments of system 1500. In the embodiment shown in FIG. 15, dynamic transportation matching system 1600 includes a management system/server 1640 in communication with a number of transit vehicles 1510*a-d* and user devices 1530*a-b* over a combination of a typical wide area network (WAN) 1650, WAN communication links 1652 (solid lines), a variety of mesh network communication links 1654 (curved dashed lines), and NFC, RFID, and/or other local communication links 1656 (curved solid lines). Dynamic transportation matching system 1600 also includes a public transportation status system 1642 in communication with a variety of public transportation vehicles, including one or more buses 1610*a*, trains 1610*b*, and/or other public transportation modalities, such as ships, ferries, light rail, subways, streetcars, trolleys, cable cars, monorails, tramways, and aircraft. As shown in FIG. 15, all transit vehicles are able to communicate directly to WAN 1650 and, in some embodiments, may be able to communicate across mesh network communication links 1654, to convey fleet data and/or fleet status data amongst themselves and/or to and from management system 1640.

In FIG. 16, user device 1530*a* may receive an input with a request for transportation with one or more transit vehicles 1510*a-d* and/or public transportation vehicles 1610*a-b*. For example, the transportation request may be a request to use (e.g., hire or rent) one of transit vehicles 1510*a-d*. The transportation request may be transmitted to management system 1640 over WAN 1650, allowing management system 1640 to poll status of transit vehicles 1510*a-d* and to select one of transit vehicles 1510*a-d* to fulfill the transportation request. Upon or after one of the transit vehicles 1510*a-d* is selected to fulfill the transportation request, a fulfillment notice from management system 1640 and/or from the selected transit vehicle 1510*a-d* may be transmitted to the user device 1530*a*. In some embodiments, navigation instructions to proceed to or otherwise meet with the selected transit vehicle 1510*a-d* may be sent to the user device 1530*a*. A similar process may occur using user device 1530*b*, but where the transportation request enables a transit vehicle over a local communication link 1656, as shown.

Management system 1640 may be implemented as a server with controllers, user interfaces, communications modules, and/or other elements similar to those described with respect to system 1500 of FIG. 10, but with sufficient processing and storage resources to manage operation of dynamic transportation matching system 1600, including monitoring statuses of transit vehicles 1510*a-d*, as described herein. In some embodiments, management system 1640 may be implemented in a distributed fashion and include multiple separate server embodiments linked communicatively to each other direction and/or through WAN 1650. WAN 1650 may include one or more of the Internet, a cellular network, and/or other wired or wireless WANs. WAN communication links 1652 may be wired or wireless WAN communication links, and mesh network communication links 1654 may be wireless communication links between and among transit vehicles 1510*a-d*, as described herein.

User device 1530*a* in FIG. 15 includes a display of user interface 1532 that shows a planned route for a user attempting to travel from an origination point 1660 to a destination 1672 using different transportation modalities (e.g., a planned multimodal route), as depicted in a route/street map 1686 rendered by user interface 1532. For example, management system 1640 may be configured to monitor statuses of all available transportation modalities (e.g., including transit vehicles and public transportation vehicles) and provide a planned multimodal route from origination point 1660 to destination 1672. Such a planned multimodal route may include, for example, a walking route 1662 from origination point 1660 to a bus stop 1664, a bus route 1666 from bus stop 1664 to a bus stop 1668 (e.g., using one or more of transit vehicles 1610*a* or 1610*b*), and a mobility route 1670 (e.g., using one or more of mobility transit vehicles 1510*b*, 1510*c*, or 1510*d*) from bus stop 1668 to destination 1672. Also shown rendered by user interface 1532 are a present location indicator 1680 (indicating a present absolute position of user device 1530*a* on street map 1686), a navigation destination selector/indicator 1682 (e.g., configured to allow a user to input a desired navigation destination), and a notice window 1684 (e.g., used to render vehicle status data or other information, including user notices and/or alerts, as described herein). For example, a user may use navigation destination selector/indicator 1682 to provide and/or change destination 1672, as well as change any portion (e.g., leg, route, etc.) or modality of the multimodal route from origination point 1660 to destination 1672. In some embodiments, notice window 1684 may display instructions for traveling to a next waypoint along the determined multimodal route (e.g., directions to walk to a bus stop, directions to ride a mobility transit vehicle to a next stop along the route, etc.).

In various embodiments, management system 1640 may be configured to provide or suggest an optimal multimodal route to a user (e.g., initially and/or while traversing a particular planned route), and a user may select or make changes to such a route through manipulation of user device 1530*a*, as shown. For example, management system 1640 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 1600, prior user trips, a desired arrival time and/or departure time (e.g., based on user input or obtained through a user calendar or other data source), available system resources (e.g., availability of one or more transmit modality options), or specifically input or set by a user for the specific route, for example, or in general. In one example, origination point 1660 may be extremely congested or otherwise hard to access by a ride-share transit vehicle, which could prevent or significantly increase a wait time for the user and a total trip time to arrive at destination 1672. In such circumstances, a planned multimodal route may include directing the user to walk and/or take a scooter/bike to an intermediate and less congested location to meet a reserved ride-share vehicle, which would allow the user to arrive at destination 1672 quicker than if the ride-share vehicle was forced to meet the user at origination point 1660. It will be appreciated that numerous different transportation-relevant conditions may exist or dynamically appear or disappear along a planned route that may make it beneficial to use different modes of transportation to arrive at destination 1672 efficiently, including changes in traffic congestion and/or other transportation-relevant conditions that occur mid-route, such as an accident along the planned route. Under such circumstances, management system 1640 may be configured to adjust a modality or portion of the planned route dynamically in order to avoid or otherwise compensate for the changed conditions while the route is being traversed.

Figure 17:
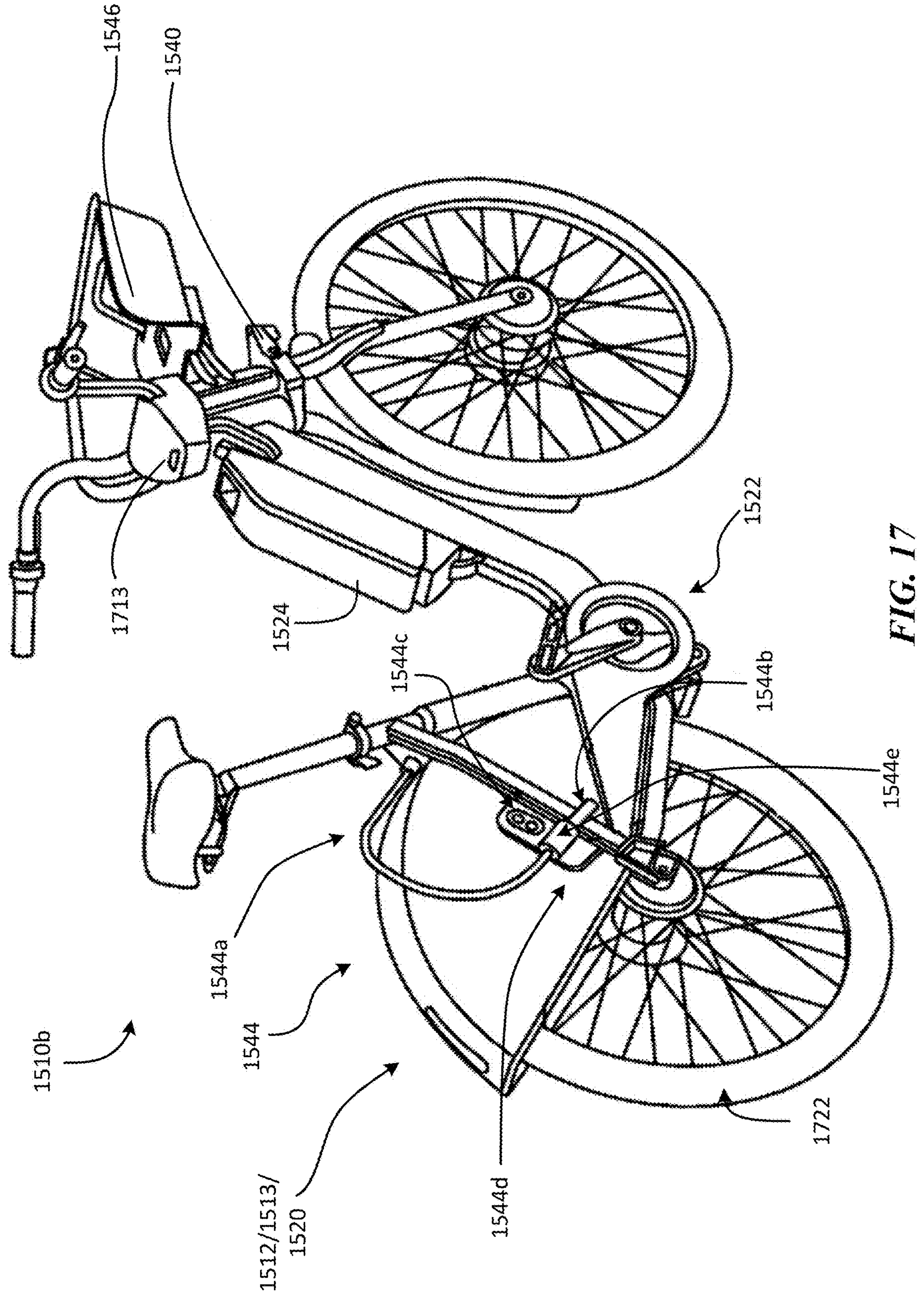
FIG. 17 illustrates a mobility transit vehicle for use in a dynamic transportation matching system, according to particular embodiments.

FIG. 17 illustrates a diagram of mobility transit vehicles 1510*b* for use in a dynamic transportation matching system. For example, transit vehicle 1510*b* of FIG. 17 may correspond to a motorized bicycle integrated with the various elements of system 1500 and may be configured to participate in dynamic transportation matching system 1600 of FIG. 15. As shown, transit vehicle 1510*b* includes controller/user interface/wireless communications module 1512/1513/1520 (e.g., integrated with a rear fender of transit vehicle 1510*b*), propulsion system 1522 configured to provide motive power to at least one of the wheels (e.g., a rear wheel 1722) of transit vehicle 1510*b*, battery 1524 for powering propulsion system 1522 and/or other elements of transit vehicle 1510*b*, docking mechanism 1540 (e.g., a spade lock assembly) for docking transit vehicle 1510*b* at a docking station, user storage 1546 implemented as a handlebar basket, and vehicle security device (e.g., an embodiment of vehicle security device 1544 of FIG. 15), which may incorporate one or more of a locking cable 1544*a*, a pin 1544*b* coupled to a free end of locking cable 1544*a*, a pin latch/insertion point 1544*c*, a frame mount 1544*d*, and a cable/pin holster 1544*e*, as shown (collectively, vehicle security device 1544). In some embodiments, controller/user interface/wireless communications module 1512/1513/1520 may alternatively be integrated on and/or within a handlebar enclosure 1713, as shown.

In some embodiments, vehicle security device 1544 may be implemented as a wheel lock configured to immobilize rear wheel 1722 of transit vehicle 1510*b*, such as by engaging pin 1544*b* with spokes of rear wheel 1722. In the embodiment shown in FIG. 17, vehicle security device 1544 may be implemented as a cable lock configured to engage with a pin latch on a docking station, for example, or to wrap around and/or through a secure pole, fence, or bicycle rack and engage with pin latch 1544*c*. In various embodiments, vehicle security device 1544 may be configured to immobilize transit vehicle 1510*b* by default, thereby requiring a user to transmit a request to management system 1640 (e.g., via user device 1530) to reserve transit vehicle 1510*b* before attempting to use transit vehicle 1510*b*. The request may identify transit vehicle 1510*b* based on an identifier (e.g., a QR code, a barcode, a serial number, etc.) presented on transit vehicle 1510*b* (e.g., such as by user interface 1513 on a rear fender of transit vehicle 1510*b*). Once the request is approved, management system 1640 may transmit an unlock signal to transit vehicle 1510*b* (e.g., via network 1650). Upon receiving the unlock signal, transit vehicle 1510*b*

(e.g., controller 1512 of transit vehicle 1510*b*) may release vehicle security device 1544 and unlock rear wheel 1722 of transit vehicle 1510*b*.

Figure 18:
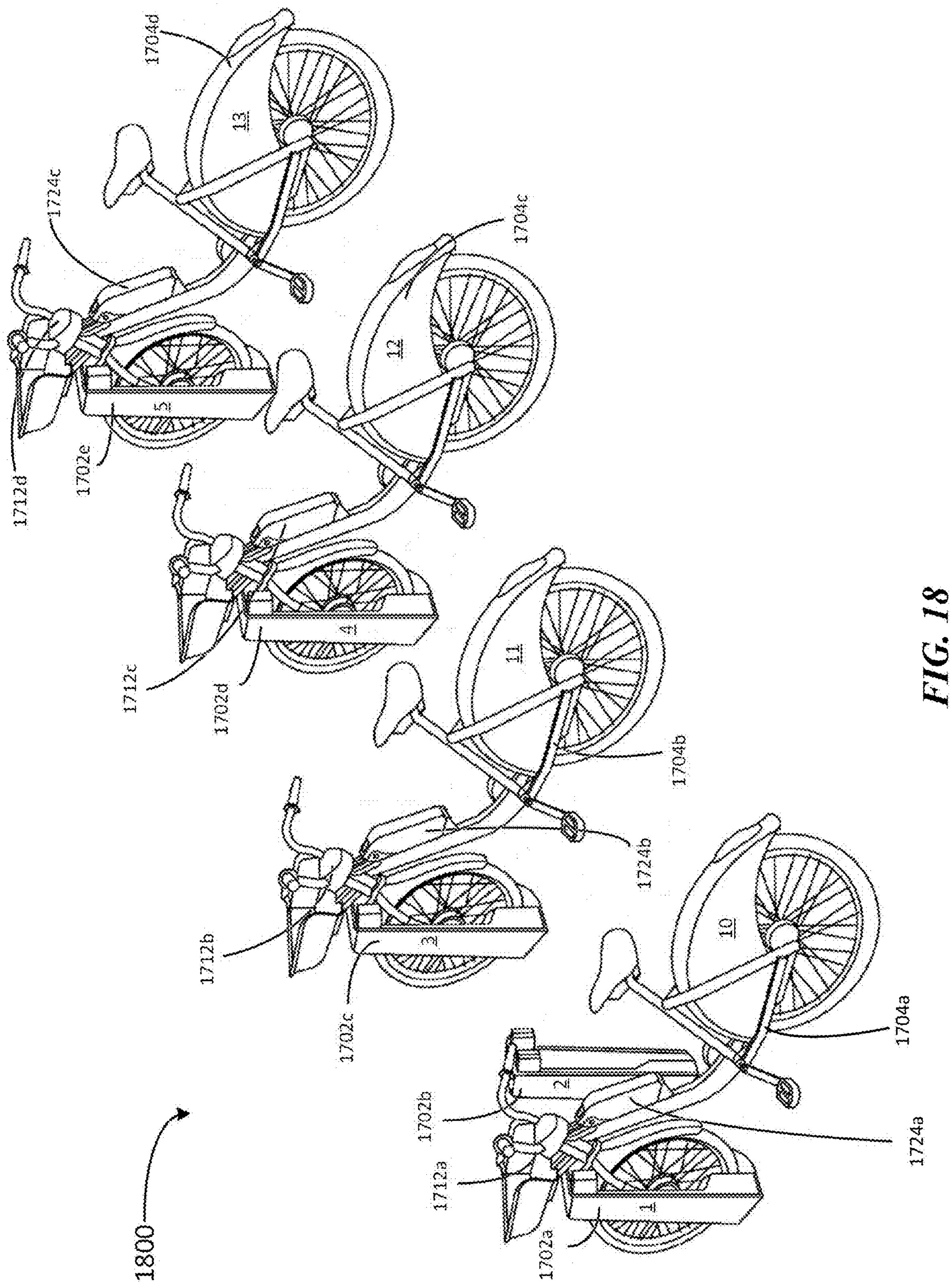
FIG. 18 illustrates a diagram of a docking station for docking one or more mobility transit vehicles, according to particular embodiments.

FIG. 18 illustrates a diagram of a docking station 1800 for docking one or more mobility transit vehicles. As shown, docking station 1800 may include multiple bicycle docks, such as docks 1702*a-e*. In this example, a single transit vehicle (e.g., any one of electric bicycles 1704*a-d*) may dock in each of the docks 1702*a-e* of the docking station 1800. Each of the docks 1702*a-e* may include a lock mechanism for receiving and locking docking mechanism 1540 of the electric bicycles 1704*a-d*. In some embodiments, once a transit vehicle is docked in a bicycle dock, the dock may be electronically coupled to the transit vehicle (e.g., controllers 1712*a-d* of the transit vehicle) via a link such that the transit vehicle and the dock may communicate with each other via the link.

A user may use a user device (e.g., user device 1530) to use a mobility transit vehicle 1510*b-d* that is docked in one of the bicycle docks 1702*a-e* by transmitting a request to management system 1640. Once the request is processed, management system 1640 may transmit an unlock signal to a mobility transit vehicle 1510*b-d* docked in the dock and/or the dock via network 1650. The docking station 1800 may automatically unlock the lock mechanism to release the mobility transit vehicle 1510*b-d* based on the unlock signal. In some embodiments, each of the docks 1702*a-e* may also be configured to charge batteries (e.g., batteries 1724*a-c*) of the electric bicycle 1704*a-d*, respectively, when the electric bicycle 1704*a-d* are docked at the docks 1702*a-e*.

In some embodiments, docking station 1800 may also be configured to transmit information associated with the docking station 1800 (e.g., a number of transit vehicles docked at the docking station 1800, charge statuses of the docked transit vehicles, a time when a transit vehicle is docked or undocked from the docking station 1800, detected nearby but undocked transit vehicles, etc.) to the management system 1640.

Miscellaneous

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

For the recitation of numeric ranges herein, the ranges are inclusive of end points, and each intervening number within the range is explicitly contemplated with the same degree of precision. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value.

What is claimed is:

1. A seat post clamp assembly for a micromobility vehicle, the seat post clamp assembly comprising:

a lead screw configured to rotate about a longitudinal axis, the lead screw comprising:
- a central shank defining the longitudinal axis,
- a first screw portion having a first set of angled threads proximate a first end of the central shank, the first set of angled threads continuing for a plurality of revolutions about the central shank,
- a second screw portion having a second set of angled threads proximate a second end of the central shank, the second set of angled threads continuing for a plurality of revolutions about the central shank, and
- an unthreaded portion of the central shank disposed between the first and second screw portions;

a first securing element disposed on a portion of the first screw portion, and a second securing element disposed on a portion of the second screw portion, the first and second securing elements longitudinally separated from each other via the unthreaded portion, the first and second sets of angled threads configured to respectively engage the first and second securing elements;

a seat adjustment lever having a first lever end and a second lever end respectively coupled to the first and second ends of the central shank; and a clamping band comprising a first clamping end and a second clamping end opposite the first clamping end, the clamping band configured to secure the seat post clamp assembly to a seat tube of the micromobility vehicle, the first and second clamping ends being pivotally coupled to the first and second securing elements, respectively, wherein rotation of the seat adjustment lever is associated with the first and second securing elements moving longitudinally toward or away from each other along the first and second sets of angled threads so as to increase or decrease a clamping force applied to the seat tube via the clamping band.

2. The seat post clamp assembly of claim 1, wherein the first and second sets of angled threads are oppositely directed.

3. The seat post clamp assembly of claim 1, wherein the first and second sets of angled threads each include a helix angle greater than 0 degrees and less than 6 degrees.

4. The seat post clamp assembly of claim 1, wherein the first and second screw portions of the lead screw are configured to apply a longitudinal self-centering force on the first and second securing elements when the lead screw is rotated about the longitudinal axis.

5. The seat post clamp assembly of claim 1, wherein the first and second screw portions of the lead screw are configured to apply equal and oppositely directed forces on the first and second securing elements when the lead screw is rotated about the longitudinal axis, the applied forces being parallel to the longitudinal axis of the lead screw and collinear with each other.

6. The seat post clamp assembly of claim 1, further comprising a housing structure, the housing structure comprising:

a curved bearing surface in contact with the unthreaded portion; and one or more bearing surfaces slidably supporting the first and second securing elements.

7. The seat post clamp assembly of claim 6, wherein the lead screw is configured to apply a radial self-centering force when the lead screw is rotated about the longitudinal axis.

8. The seat post clamp assembly of claim 1, wherein the first and second securing elements move toward or away from each other along a translation axis that is parallel to the longitudinal axis of the lead screw, the translation axis being offset from the longitudinal axis by an offset distance toward the seat tube, wherein the offset distance facilitates consistent application of the clamping force by the clamping band on the seat tube.

9. The seat post clamp assembly of claim 8, wherein, in each of the first and second sets of angled threads, a thread pitch radius is greater than a thread pitch.

10. The seat post clamp assembly of claim 1, wherein the first screw portion, the second screw portion, and the central shank form a unitary part.

11. The seat post clamp assembly of claim 1, wherein the first screw portion, the second screw portion, and the central shank are integrally formed such that the lead screw is rotationally coupled to the seat adjustment lever.

12. A micromobility vehicle, comprising:

a frame;

two or more wheels rotatably coupled to the frame; and a seat post clamp assembly located in the frame, the seat post clamp assembly comprising:

a lead screw configured to rotate about a longitudinal axis, the lead screw comprising:

a central shank defining the longitudinal axis, a first screw portion having a first set of angled threads proximate a first end of the central shank, the first set of angled threads continuing for a plurality of revolutions about the central shank, a second screw portion having a second set of angled threads proximate a second end of the central shank, the second set of angled threads continuing for a plurality of revolutions about the central shank, and an unthreaded portion of the central shank disposed between the first and second screw portions;

a first securing element disposed on a portion of the first screw portion, and a second securing element disposed on a portion of the second screw portion, the first and second securing elements longitudinally separated from each other via the unthreaded portion, the first and second sets of angled threads configured to respectively engage the first and second securing elements;

a seat adjustment lever having a first lever end and a second lever end respectively coupled to the first and second ends of the central shank; and a clamping band comprising a first clamping end and a second clamping end opposite the first clamping end, the clamping band configured to secure the seat post clamp assembly to a seat tube of the micromobility vehicle, the first and second clamping ends being pivotally coupled to the first and second securing elements, respectively, wherein rotation of the seat adjustment lever is associated with the first and second securing elements moving longitudinally toward or away from each other along the first and second sets of angled threads so as to increase or decrease a clamping force applied to the seat tube via the clamping band.

13. The micromobility vehicle of claim 12, wherein the first and second sets of angled threads are oppositely directed.

14. The micromobility vehicle of claim 12, wherein the first and second screw portions of the lead screw are configured to apply a longitudinal self-centering force on the first and second securing elements when the lead screw is rotated about the longitudinal axis.

15. The micromobility vehicle of claim 12, wherein the first and second screw portions of the lead screw are configured to apply equal and oppositely directed forces on the first and second securing elements when the lead screw is rotated about the longitudinal axis, the applied forces being parallel to the longitudinal axis of the lead screw and collinear with each other.

16. The micromobility vehicle of claim 12, wherein the first and second securing elements move toward or away from each other along a translation axis that is parallel to the longitudinal axis of the lead screw, the translation axis being offset from the longitudinal axis by an offset distance toward the seat tube, wherein the offset distance facilitates consistent application of the clamping force by the clamping band on the seat tube.

17. The micromobility vehicle of claim 12, wherein the first screw portion, the second screw portion, and the central shank are integrally formed such that the lead screw is rotationally coupled to the seat adjustment lever.

18. A method for assembling a seat post clamp assembly for a micromobility vehicle, the method comprising:

forming a lead screw so as to include:

a central shank defining a longitudinal axis, a first set of angled threads proximate a first end of the central shank, the first set of angled threads continuing for a plurality of revolutions about the central shank, a second set of angled threads proximate a second end of the central shank, the second set of angled threads continuing for a plurality of revolutions about the central shank, and an unthreaded portion of the central shank disposed between the first and second sets of angled threads;

respectively engaging the first and second sets of angled threads with a first securing element and a second securing element, the lead screw configured to rotate about the longitudinal axis, the first set of angled threads formed with a spiral in an opposite direction to a spiral of the second set of angled threads;

assembling and securing the lead screw, the first securing element, and the second securing element within a housing structure; and pivotally coupling the first and second securing elements to a first clamping end and a second clamping end of a clamping band, respectively, the clamping band coupled to a seat adjustment lever so as to secure the seat post clamp assembly to a seat tube of the micromobility vehicle.

19. The method of claim 18, further comprising coupling the seat adjustment lever to the lead screw so as to enable a user of the micromobility vehicle to increase or decrease a clamping force on the seat tube by rotating the seat adjustment lever.

20. The method of claim 18, wherein the first set of angled threads, the second set of angled threads, and the central shank are integrally formed such that the lead screw is rotationally coupled to the seat adjustment lever.

* * * * *